United States Patent
Sano et al.

(10) Patent No.: US 9,922,121 B2
(45) Date of Patent: Mar. 20, 2018

(54) SEARCH SYSTEM, SEARCH METHOD, TERMINAL APPARATUS, AND NON-TRANSITORY COMPUTER-READABLE RECORDING MEDIUM

(71) Applicant: YAHOO JAPAN CORPORATION, Tokyo (JP)

(72) Inventors: Taketo Sano, Tokyo (JP); Hiroyuki Soya, Okinawa (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 454 days.

(21) Appl. No.: 14/326,775

(22) Filed: Jul. 9, 2014

(65) Prior Publication Data
US 2015/0088664 A1 Mar. 26, 2015

(30) Foreign Application Priority Data
Sep. 20, 2013 (JP) .................................. 2013-196102

(51) Int. Cl.
*G06F 17/30* (2006.01)
*G06Q 30/02* (2012.01)

(52) U.S. Cl.
CPC .. *G06F 17/30864* (2013.01); *G06F 17/30244* (2013.01); *G06Q 30/0273* (2013.01)

(58) Field of Classification Search
None
See application file for complete search history.

(56) References Cited

U.S. PATENT DOCUMENTS

| | | | | |
|---|---|---|---|---|
| 2006/0189372 A1* | 8/2006 | Westrup | ................. | G06Q 30/02 463/17 |
| 2007/0208704 A1* | 9/2007 | Ives | ................. | G06F 17/30905 707/999.003 |
| 2010/0121844 A1* | 5/2010 | Slaney | .............. | G06F 17/30265 707/723 |
| 2010/0321411 A1* | 12/2010 | Paek | ................... | G06F 3/04883 345/684 |
| 2011/0157047 A1* | 6/2011 | Nakagawa | ............ | G06F 3/0482 345/173 |

(Continued)

FOREIGN PATENT DOCUMENTS

| | | |
|---|---|---|
| JP | 2000082039 A | 3/2000 |
| JP | A-2000-155765 | 6/2000 |
| JP | 2003006230 A | 1/2003 |

(Continued)

OTHER PUBLICATIONS

Jul. 28, 2015 Office Action issued in Japanese Application No. 2013-196102.

*Primary Examiner* — Carol Choi
(74) *Attorney, Agent, or Firm* — Oliff PLC

(57) ABSTRACT

A search system includes a terminal apparatus and a server apparatus. The server apparatus includes a response unit configured to respond image information about a web page of a search result corresponding to the search query for a web search transmitted by the terminal apparatus to the terminal apparatus. The terminal apparatus includes a receiving unit configured to receive the image information about the web page of the search result from the server apparatus, and a display control unit configured to display the image information received by the receiving unit on a display device.

15 Claims, 15 Drawing Sheets

(56) References Cited

U.S. PATENT DOCUMENTS

2011/0225524 A1* 9/2011 Cifra .................. G06F 3/04883
 715/763
2015/0011263 A1 1/2015 Itamoto

FOREIGN PATENT DOCUMENTS

JP  A-2010-277416  12/2010
WO  2013118522 A1  8/2013

* cited by examiner

FIG.11

| QUERY TYPE | PRESENCE OR ABSENCE OF CACHE | CACHE PERIOD |
|---|---|---|
| BLOG | PRESENT | 1 DAY |
| RESTAURANT WEBSITE | PRESENT | 5 DAYS |
| FLASH REPORT | ABSENT | — |
| ⋮ | ⋮ | ⋮ |

SEARCH SYSTEM, SEARCH METHOD, TERMINAL APPARATUS, AND NON-TRANSITORY COMPUTER-READABLE RECORDING MEDIUM

CROSS-REFERENCE TO RELATED APPLICATION

The present application claims priority to and incorporates by reference the entire contents of Japanese Patent Application No. 2013-196102 filed in Japan on Sep. 20, 2013.

BACKGROUND OF THE INVENTION

1. Field of the Invention

The present invention relates to a search system, a search method, a terminal apparatus, and a search program.

2. Description of the Related Art

Terminal apparatuses such as a personal computer, a mobile phone, and a smartphone have conventionally been used to do a web search. For example, when a terminal apparatus accepts input of a search keyword from a user, the terminal apparatus transmits the input search keyword to a search server. The terminal apparatus then receives text-based search results from the search server and displays the search results on a display or the like. Subsequently, when the terminal apparatus accepts selection of a desired search result from among the search results, the terminal apparatus, accesses the linked web server and makes the display of the terminal apparatus the web page.

Patent Document 1: Japanese Patent Application Laid-Open No. 2000-155765

Patent Document 2: Japanese Patent Application Laid-Open No. 2010-277416

However, according to the conventional technique, the atmosphere, the amount of information, and the like of the actual web pages are difficult to recognize from the search results. The selection of a search result may therefore be repeated many times until a desired web page is obtained. The user's convenience is poor because the user needs to wait for a page read each time.

SUMMARY OF THE INVENTION

According to one aspect of an embodiment, a search system includes a terminal apparatus; and a server apparatus; wherein the server apparatus includes a response unit configured to respond image information about a web page of a search result corresponding to the search query for a web search transmitted by the terminal apparatus to the terminal apparatus, and the terminal apparatus includes a receiving unit configured to receive the image information about the web page of the search result from the server apparatus, and a display control unit configured to display the image information received by the receiving unit on a display device.

It is an object of the present invention to at least partially solve the problems in the conventional technology.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 11 is a diagram showing an example of a cache rule;

DETAILED DESCRIPTION OF THE PREFERRED EMBODIMENTS

Embodiments of the search system, the search method, the terminal apparatus, and the search program disclosed in the present application will be described in detail below with reference to the drawings. It should be appreciated that this embodiment is not limited by the embodiments.

1. System Configuration Example

Figure 1:
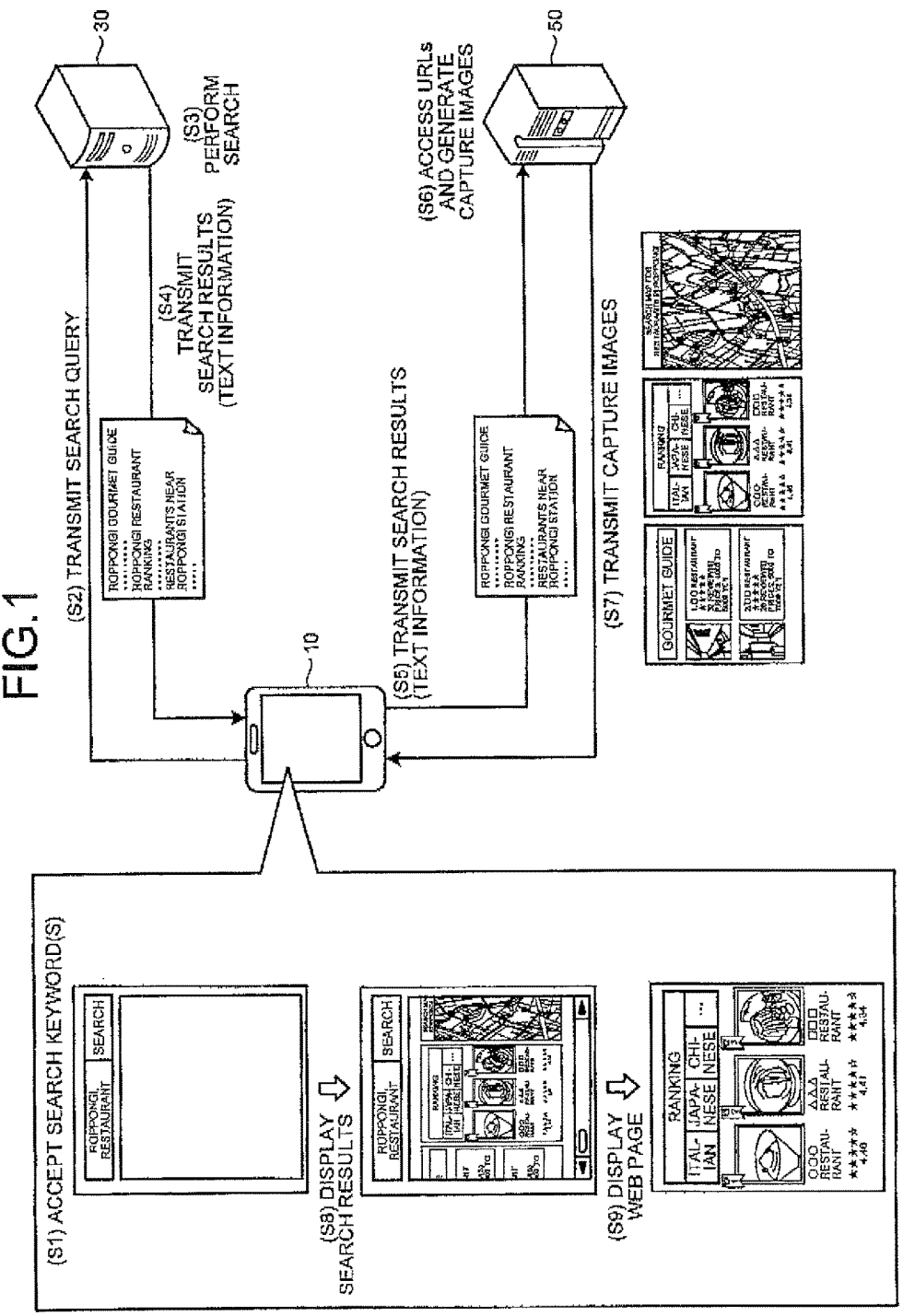
FIG. 1 is a diagram for explaining an example of an overall configuration of a search system according to an embodiment.

Initially, an example of a system configuration of a search system according to an embodiment will be described. FIG. 1 is a diagram for explaining an example of the overall configuration of the search system according to the embodiment. As shown in FIG. 1, the search system is configured to include a terminal apparatus 10, a search server 30, and a capture generation server 50.

The terminal apparatus 10 is a terminal apparatus having a wireless LAN (Local Area Network) communication function and a wireless WAN (Wide Area Network) function, like a personal computer, a mobile phone, and a smartphone. Moreover, a search program (hereinafter, sometimes referred to as a search application) is installed in the terminal apparatus 10 as an application. When this terminal apparatus 10 accepts an instruction to start execution of the search application from the user, the terminal apparatus 10 conducts a web search via the Internet or the like, and makes a touch panel or the like display search results.

The search server 30 is a server apparatus that executes a search query received from the terminal apparatus 10 to search for web pages. The capture generation server 50 is a server apparatus that captures and generates capture images of the web pages retrieved by the search server 30. Moreover, the capture generation server 50 transmits the generated capture images of the web pages to the terminal apparatus 10.

Now, the processing of the search system shown in FIG. 1 will be specifically described by using an example. As shown in FIG. 1, when the terminal apparatus 10 accepts input of "Roppongi, restaurant" or the like as search keywords for a web search from the user (S1), the terminal apparatus 10 transmits a search query requesting to search for web pages corresponding to "Roppongi, restaurant" to the search server 30 (S2).

The search server 30 receiving this search query searches for web pages corresponding to "Roppongi, restaurant" by using a search engine (S3). Here, the search server 30 generates text information indicating web pages of "Roppongi gourmet guide," "Roppongi restaurant ranking," and "restaurants near Roppongi station" as search results. It should be appreciated that each piece of text information is associated with a URL (Uniform Resource Locator) that is the link destination of the corresponding web page.

Subsequently, the search server 30 transmits the search results to the terminal apparatus 10 (S4). The terminal apparatus 10 then transfers the search results transmitted from the search server 30 to the capture generation server 50 (S5). For example, the terminal apparatus 10 writes the capture generation server 50 in the search query as a redirection destination in advance, so that the response from the search server 30 is redirected to the capture generation server 50.

The capture generation server 50 receiving these search results accesses the URLs respectively associated with "Roppongi gourmet guide," "Roppongi restaurant ranking," and "restaurants near Roppongi station," and reads HTML (Hyper Text Markup Language) to obtain the web pages, and generates the capture images of the respective web pages (56). In other words, the capture generation server 50 generates the capture images of the web pages corresponding to the respective search results obtained by the search of the search server 30.

Subsequently, the capture generation server 50 transmits a list of capture images to the terminal apparatus 10 (S7). Here, the capture generation server 50 transmits the capture images in association with the URLs of the web pages that are the original data of the respective capture images.

The terminal apparatus 10 then displays the capture images received from the capture generation server 50 on the touch panel or the like (S8). In other words, the terminal apparatus 10 responds the capture images to the user as the search results of the search keywords "Roppongi, restaurant" input by the user.

Next, if a capture image displayed is selected by the user, the terminal apparatus 10 displays a web browser, accesses the URL associated with the selected capture image, and displays the accessed web page on the touch panel or the like (S9).

In such a manner, the terminal apparatus 10 transmits a search query to the search server 30 on the basis of an input search keyword or keywords, receives capture images as a response to the search query from the capture generation server 50, and displays the capture images.

2. Functional Configuration of Search System

Figure 2:
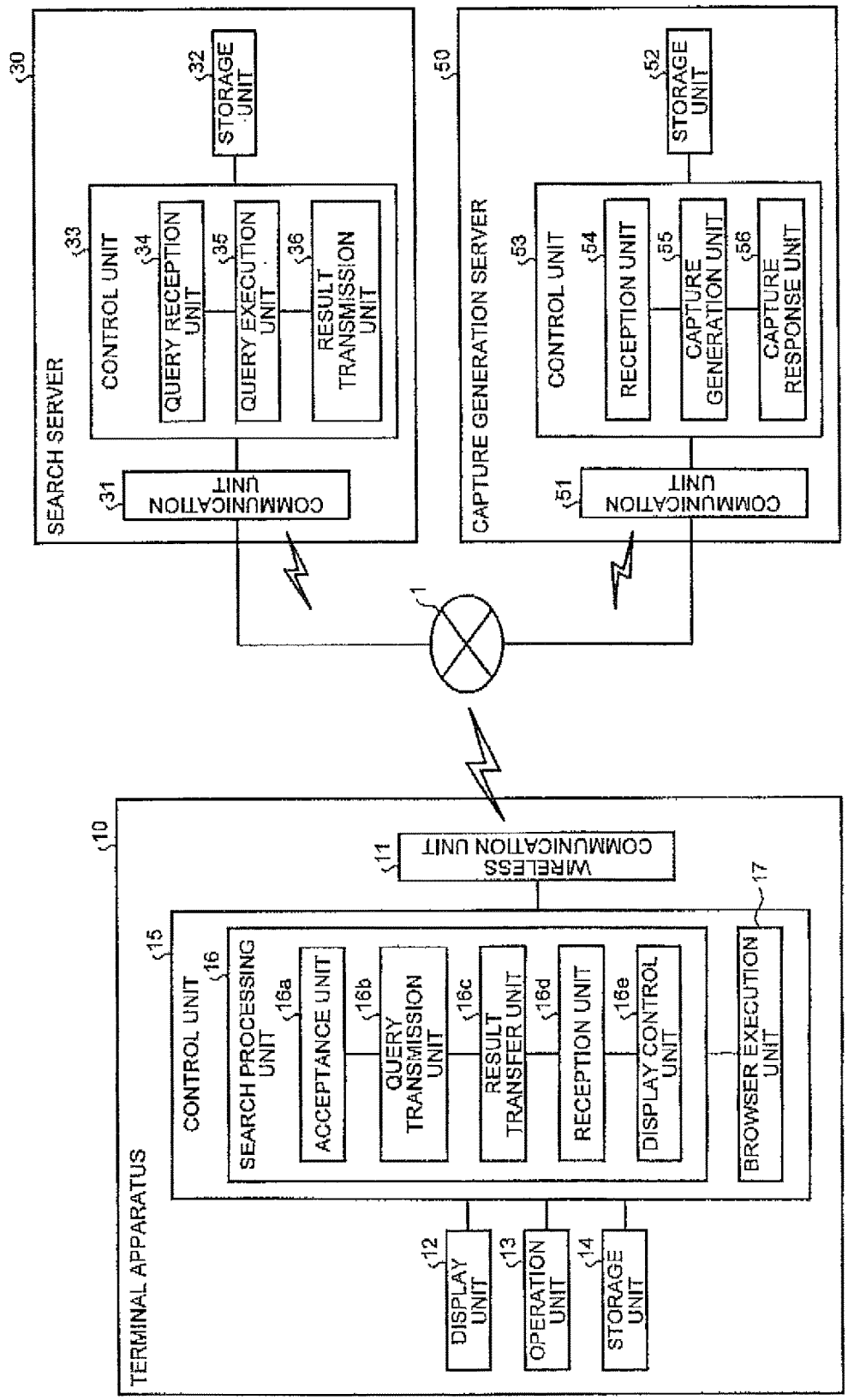
FIG. 2 is a functional block diagram showing a functional configuration of each apparatus constituting the search system.

Next, a functional configuration of each apparatus constituting the search system will be described. FIG. 2 is a functional block diagram showing the functional configuration of each apparatus constituting the search system. As shown in FIG. 2, the search system is configured to include the terminal apparatus 10, the search server 30, and the capture generation server 50. The apparatuses are communicably connected to each other via a communication network 1. For example, the communication network 1 is a WAN such as the Internet.

For example, the terminal apparatus 10 is connected with the search server 30 and the capture generation server 50 by wireless communication such as a wireless LAN and a public telephone communication network. Moreover, the search server 30 and the capture generation server 50 are connected by wireless communication or wired communication. Here, the search server 30 and the capture generation server 50 are described to be implemented in separate cases. However, this is not restrictive, and the search server 30 and the capture generation server 50 may be implemented in the same case.

2-1. Functional Configuration of Terminal Apparatus

As shown in FIG. 2, the terminal apparatus 10 includes a wireless communication unit 11, a display unit 12, an operation unit 13, a storage unit 14, and a control unit 15.

The wireless communication unit 11 is a processing unit that performs wireless communication with the search server 30 and the capture generation server 50. Examples thereof include a wireless interface. Specifically, the wireless communication unit 11 establishes wireless communication with each server via a not-shown wireless LAN or wireless WAN access point or a base station of a public telephone communication network, and transmits and receives various types of information.

For example, the wireless communication unit 11 transmits a search query to the search server 30, and transfers search results transmitted by the search server 30 to the capture generation server 50. Moreover, the wireless communication unit 11 receives a list of capture images from the capture generation server 50.

The display unit 12 is a touch panel type display. The user of the terminal apparatus 10 can operate the screen of the display unit 12 with a finger or the like, thereby making operations on the screen of the search application displayed on the display unit 12. Examples of such a display unit 12 include a small-sized LCD (Liquid Crystal Display) and an organic EL display.

The operation unit 13 includes a keyboard including keys for inputting characters, numerals, and a space, an enter key, and arrow keys, and a power button.

For example, the storage unit 14 is a semiconductor memory device such as a RAM (Random Access Memory) and a flash memory, or a storage device such as a hard disk and an optical disc. Various programs, setting data, and the like are stored in such a storage unit 14. Examples of the programs stored in the storage unit 14 include an OS (Operating System) and the program of the search application.

For example, the control unit 15 is implemented by an integrated circuit such as an ASIC (Application Specific Integrated Circuit) and an FPGA (Field Programmable Gate Array). Moreover, the control unit 15 implements or performs the functions and operations of information processing to be described later, for example, by executing a program stored in the storage unit 14 by a CPU (Central Processing Unit), MPU (Micro Processing Unit), or the like with a not-shown internal RAM as a work area.

Functions of Search Application

The control unit 15 executes the search application, of which program data is stored in the storage unit 14, to make a search processing unit 16 function. If an icon or the like of the search application displayed on the display unit 12 is selected by the user, the search operation unit 16 performs the functions of an acceptance unit 16a, a query transmission unit 16b, a result transfer unit 16c, a reception unit 16d, and a display control unit 16e. It should be appreciated that the configuration of the control unit 15 is not limited to such a configuration and other configurations may be used as long as the configurations perform the information processing to be described later.

Acceptance Unit 16a

The acceptance unit 16a is a processing unit that accepts the input of a search keyword(s) of web pages from the user. For example, if the icon or the like of the search application is selected, the acceptance unit 16a displays a screen for inputting a search keyword(s). The acceptance unit 16a then accepts the input of a search keyword(s) via the display unit 12, the operation unit 13, and the like. The acceptance unit 16a outputs the input search keyword(s) such as "Roppongi, restaurant" to the query transmission unit 16b.

Query Transmission Unit 16b

The query transmission unit 16b is a processing unit that transmits a search query. Specifically, the query transmission unit 16b transmits a search query including the search keyword(s) accepted by the acceptance unit 16a to the search server 30 via the wireless communication unit 11.

For example, the query transmission unit 16b generates a search query including the search keywords "Roppongi, restaurant" and a redirection destination, and transmits the search query to the search server 30. An IP (Internet Protocol) address of the capture generation server 50, identification information that can identify the capture generation server 50, or the like may be employed as the redirection destination.

Result Transfer Unit 16c

The result transfer unit 16c is a processing unit that transfers search results received from the search server 30 to the capture generation server 50. For example, the result transfer unit 16c receives text information such as "Roppongi gourmet guide," "Roppongi restaurant ranking," and "restaurants near Roppongi" as search results via the wireless communication unit 11. The result transfer unit 16c then transfers the received search results (text information) to the capture generation server 50 via the wireless communication unit 11.

At the time of transfer, the result transfer unit 16c identifies the redirection destination from a packet including the search results received from the search server 30, and transfers the search results to the identified redirection destination. Even if the packet includes no redirection destination, the result transfer unit 16c may transfer the search results to a previously designated capture generation server 50, provided that the received packet is a response to a search query. Whether the received packet is a response to a search query can be determined depending on whether the packet includes an identifier that indicates being a response to a search query.

Reception Unit 16d

The reception unit 16d is a processing unit that receives capture images of web pages from the capture generation server 50. For example, the reception unit 16d receives a capture image of a web page of the search result "Roppongi gourmet guide," a capture image of a web page of the search result "Roppongi restaurant raking," and a capture image of a web page of the search result "restaurants near Roppongi station" corresponding to the search query "Roppongi, restaurant," and outputs the capture images to the display control unit 16e.

It should be appreciated that the capture images of the web pages are associated with the URLs of the respective web pages captured. The reception unit 16d stores the capture images and the URLs in the storage unit 14 or the like in association with each other. The terminal apparatus 10 can thus identify the actual web pages from the capture images of the web pages.

Display Control Unit 16e

The display control unit 16e is a processing unit that makes the display unit 12 display image information about the web pages received by the reception unit 16d. In the foregoing example, the display control unit 16e makes the display unit 12 display the capture image of the web page of the search result "Roppongi gourmet guide," the capture image of the web page of the search result "Roppongi restaurant ranking," and the capture image of the web page of the search result "restaurants near Roppongi station" in order of reception.

Here, the display control unit 16e can make the display unit 12 display the capture images in an arbitrary display format such as a list of capture images and a display format capable of selection by a flick operation. The display control unit 16e can also render the capture images according to the size of the display area of the display unit 12, and make the display unit 12 display the resulting capture images.

In view of securing the order of search by the search engine, the display control unit 16e desirably makes the display unit 12 display the capture images in the order in which the capture images are retrieved by the execution of the search query.

Specifically, if the search server 30 has retrieved "Roppongi gourmet guide," "Roppongi restaurant ranking," and "restaurants near Roppongi station" in such order, the display control unit 16e makes the display unit 12 display the capture image of the web page of "Roppongi gourmet guide," the capture image of the web page of "Roppongi restaurant ranking," and the capture image of the web page of "restaurants near Roppongi station" in such order.

It should be appreciated that various methods may be used to identify the order of search results. For example, if it is determined as a rule of the system to transmit capture images in retrieved order, the display control unit 16e can make the display unit 12 display the capture images in the order in which the capture images are received from the capture generation server 50. If the received capture images include additional information indicating the order of reception, the display control unit 16e can make the display unit 12 display the capture images in the order according to the information.

Moreover, if a flick operation on a capture image(s) is accepted on the display unit 12, the display control unit 16e shifts the capture image(s) according to the flick operation. For example, if a flick operation for shifting the screen to the left is accepted, the display control unit 16e shifts the capture image(s) to be displayed to the left, and makes the display unit 12 display the next capture image(s). If a flick operation for shifting the screen up or down is accepted, the display control unit 16e makes the display unit 12 display a portion hidden due to the screen size.

Moreover, if a flick operation for enlargement, reduction, or the like is accepted, the display control unit 16e enlarges or reduces the capture images and makes the display unit 12 display the resulting capture images.

Moreover, for example, if a selection operation on the capture image of the web page of "Roppongi gourmet guide" is accepted, the display control unit 16e requests a browser execution unit 17 to make web access. For example, the display control unit 16e reads the URL associated with the selected capture image from the storage unit 14 and notifies the browser execution unit 17 of the URL. It should be appreciated that the display control unit 16e determines it to be a selection operation and makes the browser execution unit 17 make web access if a double click, a state of being continuously pressed for a predetermined time, i.e., a so-called long press, or the like is detected.

Browser Execution Unit 17

The browser execution unit 17 is a processing unit that executes a web browser and makes the display unit 12 display a web page. Specifically, the browser execution unit 17 displays the web browser if a capture image displayed on the display unit 12 is selected. The browser execution unit 17 then makes web access via the wireless communication unit 11, and makes the display unit 12 display the corresponding web page.

For example, if a web access request for the capture image of the web page of "Roppongi gourmet guide" is input from the display control unit 16e, the browser execution unit 17 displays the web browser. The browser execution unit 17 then accesses the URL associated with the selected capture image to obtain the actual web page of "Roppongi gourmet guide." Subsequently, the browser execution unit 17 makes the display unit 12 display the obtained web page.

2-2. Functional Configuration of Search Server

As shown in FIG. 2, the search server 30 includes a communication unit 31, a storage unit 32, and a control unit 33. The shown functional units are exemplary and not restrictive. The search server 30 may include a display unit and/or an input unit.

The communication unit 31 is a processing unit that performs communication with the terminal apparatus 10 and the capture generation server 50. Examples thereof include a network interface card and a wireless interface. Specifically, the communication unit 31 establishes communication with the terminal apparatus 10 and the capture generation server 50 by wireless communication via a not-shown access point, base station, or the like, and/or by wired communication using various cables and the like, and transmits and receives various types of information.

For example, the communication unit 31 receives a search query from the terminal apparatus 10. Moreover, the communication unit 31 transmits search results retrieved by using the search query to the terminal apparatus 10.

For example, the storage unit 32 is a semiconductor memory device such as a RAM and a flash memory, or a storage device such as a hard disk and an optical disc. Various programs, setting data, and the like are stored in such a storage unit 32. Examples of the programs stored in the storage unit 32 include an OS and a program to be executed by the control unit 33 to be described later.

For example, the control unit 33 is implemented by an integrated circuit such as an ASIC and an FPGA. Moreover, the control unit 33 implements or performs the functions and operations of information processing to be described later, for example, by executing a program stored in the storage unit 32 by a CPU, MPU, or the like with a not-shown internal RAM as a work area.

The control unit 33 executes program data stored in the storage unit 32 to make a query reception unit 34, a query execution unit 35, and a result transmission unit 36 function.

It should be appreciated that the configuration of the control unit 33 is not limited to such a configuration and other configurations may be used as long as the configurations perform the information processing to be described later.

Query Reception Unit 34

The query reception unit 34 is a processing unit that receives the search query from the terminal apparatus 10.

For example, the query reception unit 34 receives the search query including the search keywords "Roppongi, restaurant" and the redirection destination from the terminal apparatus 10 via the communication unit 31. The query reception unit 34 then outputs the received search query to the query execution unit 35.

Query Execution Unit 35

The query execution unit 35 is a processing unit that executes the search engine to retrieve search results corresponding to the search query. Specifically, the query execution unit 35 searches for web pages corresponding to the search query received by the query reception unit 34, and generates text information in which web information indicating the titles and the like of the web pages are associated with URLs. The query execution unit 35 then outputs the generated text information to the result transmission unit 36 as search results.

For example, the query execution unit 35 searches for web pages corresponding to the search keywords "Roppongi, restaurant" included in the search query, and obtains the web pages of "Roppongi gourmet guide," "Roppongi restaurant ranking," and "restaurants near Roppongi station." The query execution unit 35 then generates text information in which the titles of the respective web pages are associated with URLs. Here, the query execution unit 35 may further associate information indicating the order of retrieval.

Result Transmission Unit 36

The result transmission unit 36 is a processing unit that transmits the search results to the terminal apparatus 10. Specifically, the result transmission unit 36 transmits the search results including the text information input from the query execution unit 35 and the redirection destination extracted from the search query to the terminal apparatus 10. The search results transmitted here are transferred by the terminal apparatus 10 to the capture generation server 50 which is the redirection destination.

2-3. Functional Configuration of Capture Generation Server

As shown in FIG. 2, the capture generation server 50 includes a communication unit 51, a storage unit 52, and a control unit 53. The shown functional units are exemplary and not restrictive. The capture generation server 50 may include a display unit and/or an input unit.

The communication unit 51 is a processing unit that performs communication with the terminal apparatus 10 and the search server 30. Examples thereof include a network interface card and a wireless interface. Specifically, the communication unit 51 establishes communication with the terminal apparatus 10 and the search server 30 by wireless communication via a not-shown access point, base station, or the like, and/or by wired communication using various cables and the like, and transmits and receives various types of information.

For example, the communication unit 51 receives search results from the terminal apparatus 10. Moreover, the communication unit 51 transmits a list of capture images to the terminal apparatus 10.

For example, the storage unit 52 is a semiconductor memory device such as a RAM and a flash memory, or a storage device such as a hard disk and an optical disc.

Various programs, setting data, and the like are stored in such a storage unit 52. Examples of the programs stored in the storage unit 52 include an OS and a program to be executed by the control unit 53 to be described later.

For example, the control unit 53 is implemented by an integrated circuit such as an ASIC and an FPGA. Moreover, the control unit 53 implements or performs the functions and operations of information processing to be described later, for example, by executing a program stored in the storage unit 52 by a CPU, MPU, or the like with a not-shown internal RAM as a work area.

The control unit 53 executes program data stored in the storage unit 52 to make a reception unit 54, a capture generation unit 55, and a capture response unit 56 function.

It should be appreciated that the configuration of the control unit 53 is not limited to such a configuration and other configurations may be used as long as the configurations perform the information processing to be described later.

Reception Unit 54

The reception unit 54 is a processing unit that receives search results retrieved by the search server 30 on the basis of the search query. For example, the reception unit 54 receives search results including text information in which the titles of the respective web pages of "Roppongi gourmet guide," "Roppongi restaurant guide," and "restaurants near Roppongi station" are associated with URLs from the terminal apparatus 10 via the communication unit 51. The reception unit 54 then outputs the received search results to the capture generation unit 55.

Capture Generation Unit 55

The capture generation unit 55 is a processing unit that generates capture images of web pages. Specifically, the capture generation unit 55 accesses the URLs included in the search results received by the reception unit 54 to obtain web pages, and generates capture images of the respective web pages.

In the case of the foregoing example, the capture generation unit 55 accesses the URL of "Roppongi gourmet guide" included in a search result, obtains the web page corresponding to "Roppongi gourmet guide," and generates a capture image. The capture generation unit 55 also accesses the URL of "Roppongi restaurant ranking" and the URL of "restaurants near Roppongi station" included in search results, and generates capture images of the respective corresponding web pages.

The capture generation unit 55 then generates capture information in which the URLs of "Roppongi gourmet guide," "Roppongi restaurant ranking," and "restaurants near Roppongi station" are associated with the respective capture images, and outputs the capture information to the capture response unit 56. Here, the capture generation unit 55 may further associate information indicating the order of retrieval.

Moreover, if a web page to be accessed includes a Java (registered trademark) script, Flash Player (registered trademark), and/or the like, the capture generation unit 55 can capture a web page where the Java (registered trademark) script and the like are executed.

Capture Response Unit 56

The capture response unit 56 is a processing unit that transmits a list of capture images of the web pages to the terminal apparatus 10. For example, the capture response unit 56 transmits the capture information in which the "capture images of the web pages" generated by the capture generation unit 55 are associated with the "URLs of the web pages" to the terminal apparatus 10 via the communication unit 51. Here, the capture response unit 56 may transmit the capture images in the order of retrieval by the search server 30.

In other words, the capture response unit 56 responds not text information such as the URLs retrieved by the search server 30 but image information captured by actual access to the terminal apparatus 10 as a response to the search query that the terminal apparatus 10 has transmitted to the search server 30.

3. Screen Transition of Terminal Apparatus

Figure 3:
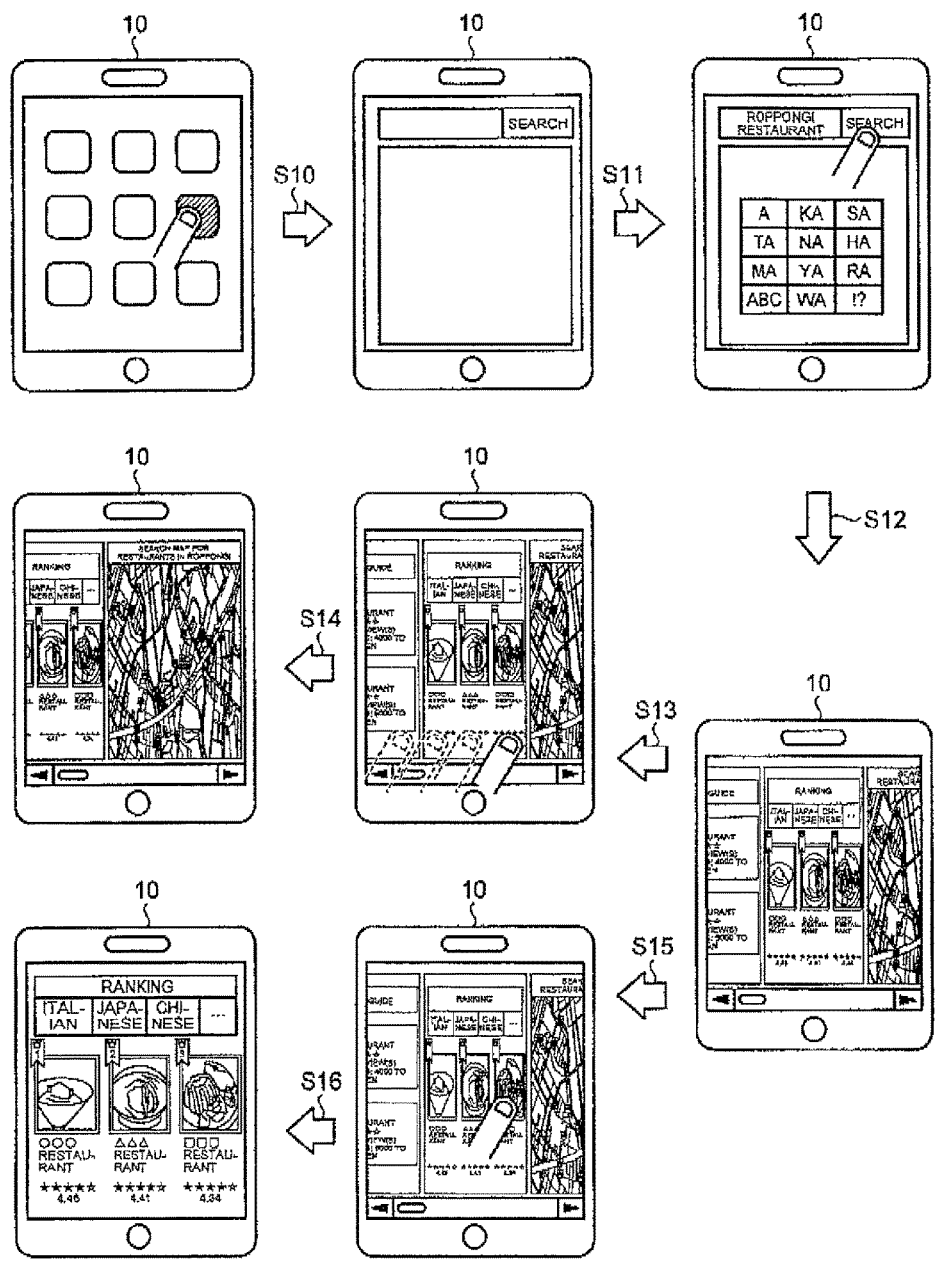
FIG. 3 is a diagram for explaining a screen transition of a terminal apparatus.

Next, an example of transition of a screen displayed on the terminal apparatus 10 will be specifically described by using FIG. 3. FIG. 3 is a diagram for explaining the screen transition of the terminal apparatus. As shown in FIG. 3, the display unit 12 of the terminal apparatus 10 displays icons of respective applications.

If the user selects the icon of the "search application" in such a state, the search processing unit 16 activates the "search application." The acceptance unit 16a makes the display unit 12 display a search acceptance screen for inputting a search keyword or keywords (S10).

Subsequently, if the user selects the input field of a search keyword(s), the acceptance unit 16a makes the display unit 12 display an input key operation screen, and accepts the input of the keywords "Roppongi, restaurant" (S11).

The query transmission unit 16b then transmits a search query including the search keywords "Roppongi, Restaurant" to the search server 30. The reception unit 16d receives capture information from the capture generation server 50.

Subsequently, the display control unit 16e makes the display unit 12 display the capture images of the web pages of "Roppongi gourmet guide," "Roppongi restaurant ranking," and "restaurants near Roppongi station" received from the capture generation server 50 in such order (S12). In the shown example, the capture images are displayed in the order of retrieval from the left.

In such a state, the display control unit 16e detects a flick operation of selecting and moving the capture image corresponding to "Roppongi restaurant ranking" displayed near the center to the left (S13). The display control unit 16e then makes the display unit 12 move the capture images to the left and display the capture image corresponding to "restaurants near Roppongi station," which is the search result following "Roppongi restaurant ranking," near the center (S14). In such a manner, the display control unit 16e can cause the images to transition according to the user's flick operation.

In another case, the display control unit 16e detects a selection operation on "Roppongi restaurant ranking" displayed near the center (S15). The display control unit 16e then reads the URL of the selected "Roppongi restaurant ranking" from the storage unit 14 or the like, and notifies the browser execution unit 17 of the URL. The browser execution unit 17 displays the web browser, accesses the notified URL, and makes the display unit 12 display the web page (S16).

In such a manner, the terminal apparatus 10 can perform the transition of the capture images and make access to actual web pages according to various operations of the user.

4. Flow of Search Processing

Figure 4:
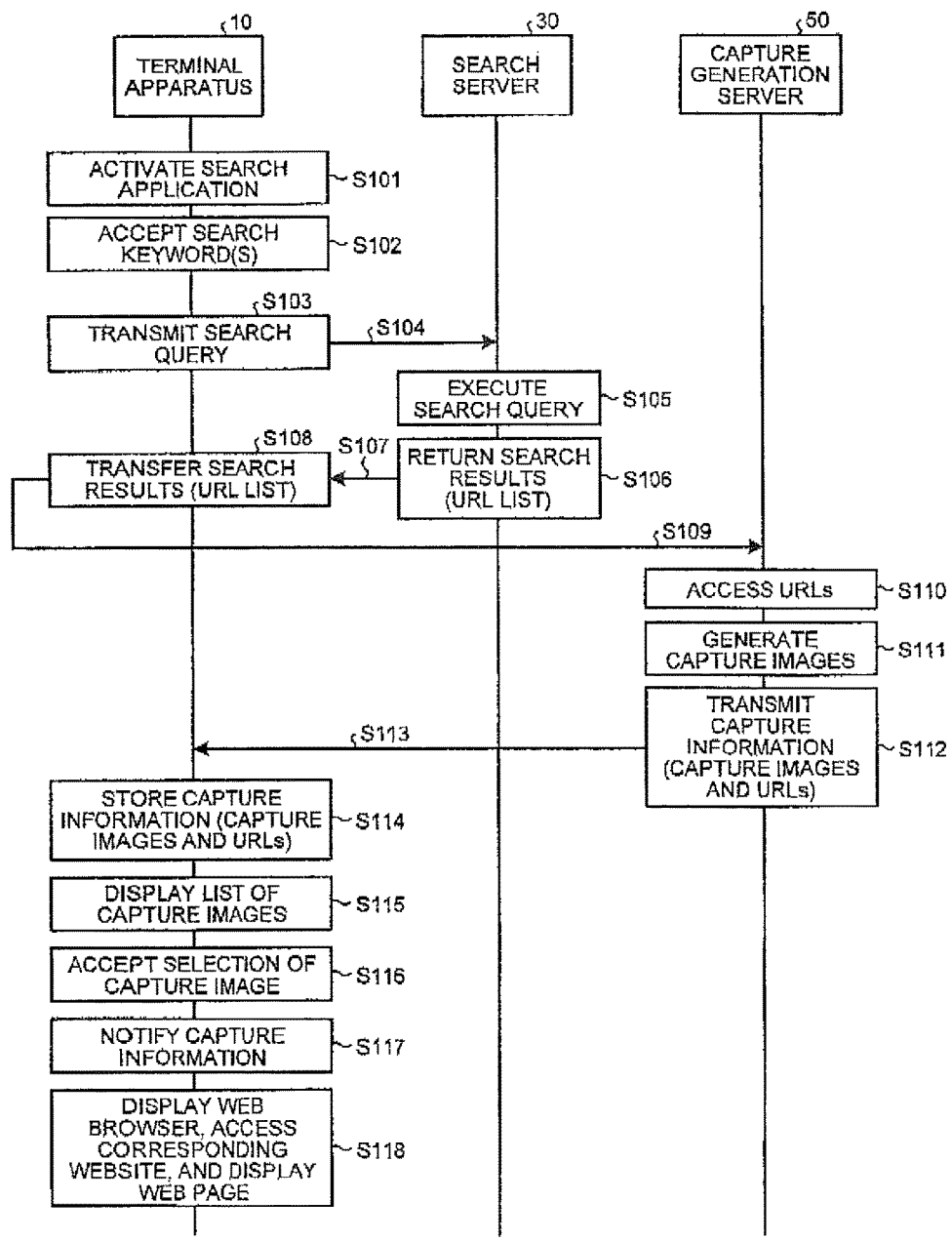
FIG. 4 is a sequence diagram showing a flow of search processing.

FIG. 4 is a sequence diagram showing the flow of the search processing. As shown in FIG. 4, the search processing unit 16 of the terminal apparatus 10 activates the search application according to a user operation (S101).

Next, the acceptance unit 16a of the terminal apparatus 10 makes the display unit 12 display the input screen of a search keyword(s), and accepts input of a search keyword(s) (S102). Subsequently, the query transmission unit 16b transmits a search query including the search keyword(s) to the search server 30 (S103 and S104).

The query execution unit 35 of the search server 30 executes the search query transmitted by the terminal apparatus 10 to search for web pages corresponding to the search query (S105). Next, the result transmission unit 36 transmits search results including the titles and URLs of the retrieved web pages to the terminal apparatus 10 (S106 and S107).

Here, the result transfer unit 16e of the terminal apparatus 10 transfers the search results transmitted by the search server 30 to the capture generation server 50 by using redirection or the like (S108 and S109).

The capture generation unit 55 of the capture generation server 50 accesses the URLs included in the received search results to obtain web pages (8110), and generates capture images of the respective web pages (S111). Subsequently, the capture response unit 56 transmits capture information including a list of generated capture images and the URLs of the captured web pages to the terminal apparatus 10 (S112 and S113).

Next, the reception unit 16d of the terminal apparatus 10 stores the capture information received from the capture generation server 50 in the storage unit 14 or the like (3114). The display control unit 16e then makes the display unit 12 display the capture images included in the capture information (S115).

Subsequently, the display control unit 16e detects selection of a capture image (S116), and notifies the browser execution unit 17 of the capture information (S117). The browser execution unit 17 then displays the web browser, accesses the URL associated with the capture image, and makes the display unit 12 display the corresponding web page (S118).

5. Interlocked Operation Between Capture Image and Web Page

Next, if a capture image displayed on the display unit 12 is scrolled, the terminal apparatus 10 may display a scrolled web page corresponding to the capture image. The following description deals with a case where a web page is operated in an interlocked manner with the scrolling of a capture image.

Description of Interlocked Operation

Figure 5:
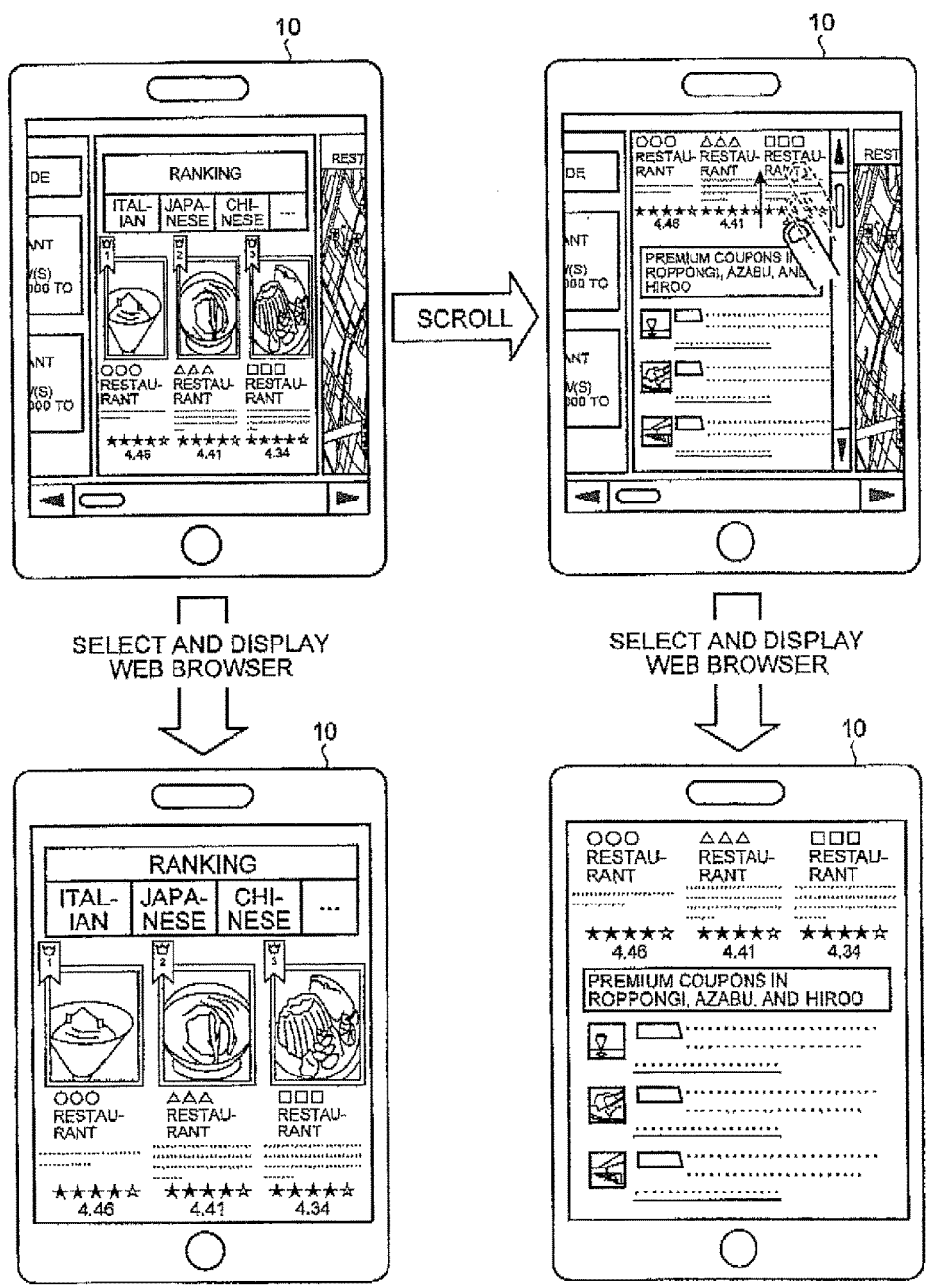
FIG. 5 is a diagram for explaining an interlocked operation between a capture image and a web page.

FIG. 5 is a diagram for explaining an interlocked operation between a capture image and a web page. As shown in FIG. 5, a description will be given by using an example where the terminal apparatus 10 is displaying the capture image of the web page of "Roppongi restaurant ranking" near the center.

If the capture image is double-clicked or otherwise operated in such a state, the browser execution unit 17 of the terminal apparatus 10 receives the URL and the like of "Roppongi restaurant ranking" from the display control unit 16e. The browser execution unit 17 displays the web browser, accesses the URL to obtain the web page, and makes the display unit 12 display the web page.

On the other hand, if the display control unit 16e of the terminal apparatus 10 accepts an upward scroll operation on the capture image of the web page of "Roppongi restaurant ranking," the display control unit 16e scrolls the capture image up and makes the display unit 12 display a hidden lower portion of the capture image.

If the capture image is double-clicked or otherwise operated in such a scrolled state, the browser execution unit 17 of the terminal apparatus 10 displays the web browser, accesses the corresponding URL to obtain the web page, and makes the display unit 12 display the web page. Here, the browser execution unit 17 scrolls the obtained web page like the capture image before making the display unit 12 display the web page.

Flow of Processing

Figure 6:
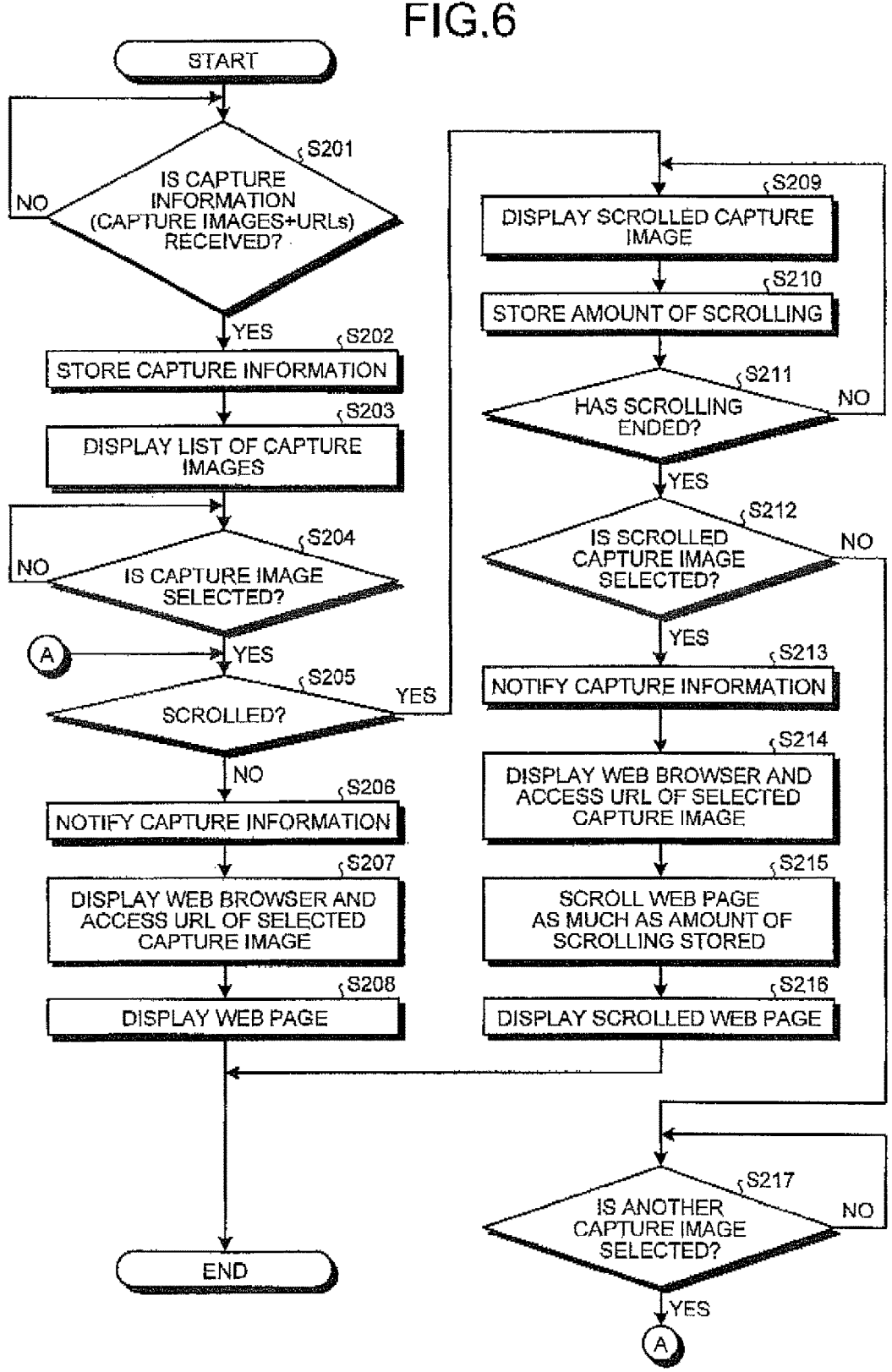
FIG. 6 is a flowchart showing a flow of interlocked operation processing of a capture image and a web page.

Next, the flow of the processing described in FIG. 5 will be described. FIG. 6 is a flowchart showing the flow of the interlocked operation processing of the capture image and the web page. As shown in FIG. 6, if the reception unit 16d of the terminal apparatus 10 receives capture information including capture images and URLs from the capture generation server 50 (S201: Yes), the reception unit 16d stores the received capture information in the storage unit 14 or the like (S202).

Next, the display control unit 16e displays a list of received capture images on the display unit 12 (S203). Then, if a displayed capture image is selected (S204: Yes), the display control unit 16e determines whether a scroll operation has occurred (S205).

Here, if the display control unit 16e detects no scroll operation (S205: No), the display control unit 16e notifies the browser execution unit 17 of the information about the selected capture image (S206). The browser execution unit 17 then displays the web browser and accesses the URL corresponding to the selected capture image (S207). Subsequently, the browser execution unit 17 makes the display unit 12 display the accessed web page (S208).

On the other hand, if the display control unit 16e detects a scroll operation (S205: Yes), the display control unit 16e makes the display unit 12 display the scrolled capture image (S209). The display control unit 16e then stores the amount of scrolling performed by the scrolling in the storage unit 14 or the like (S210). It should be appreciated that the amount of scrolling can be obtained by various known methods. Subsequently, the display control unit 16e returns to S209 to repeat displaying the scrolled capture image and storing the amount of scrolling until the scrolling ends (S211: No).

If the scrolling has ended (S211: Yes), the display control unit 16e then determines whether the scrolled capture image is selected (S212).

Here, if the scrolled capture image is selected (S212: Yes), the display control unit 16e notifies the browser execution unit 17 of the information about the selected capture image (S213). The browser execution unit 17 then displays the web browser and accesses the URL corresponding to the selected capture image (S214). Subsequently, the browser execution unit 17 scrolls the accessed and obtained web page as much as the amount of scrolling stored in the storage unit 14 (S215). The display control unit 16e then makes the display unit 12 display the scrolled web page (S216).

On the other hand, if the scrolled capture image is not selected in S212 (S212: No) and another capture image is selected (S217: Yes), the display control unit 16e returns to S205 and repeats the subsequent processing on the newly selected capture image.

Note that even if the scrolled capture image is not selected and another capture image is selected, the display control unit 16e may continue storing the amount of scrolling. Specifically, the display control unit 16e stores the amount of scrolling for each capture image. In such a manner, a capture image A can be displayed in a previous scroll position when the user scrolls the capture image A, flicks to a capture image B, and then flicks again to display the capture image A.

6. Flick Operations and Functions on Capture Image

If a predetermined flick operation is performed on a capture image displayed on the display unit 12, the terminal apparatus 10 can automatically execute a function associated with the flick operation. Flick operations and functions on a capture image will be described below.

Description of Processing Contents

Figure 7:
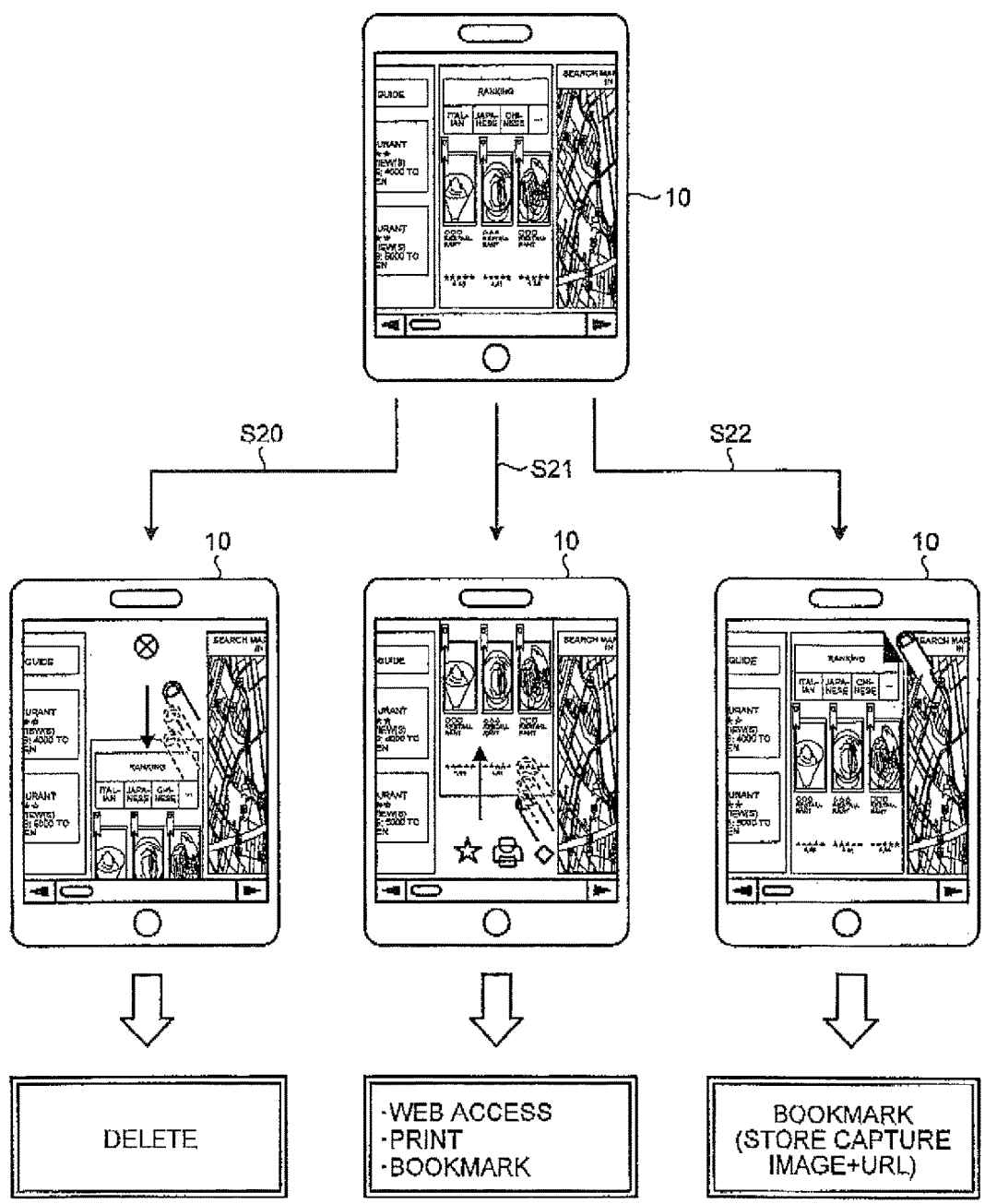
FIG. 7 is a diagram for explaining automatic execution of functions by flick operations.

Initially, a relationship between flick operations and functions will be described by using FIG. 7. FIG. 7 is a diagram for explaining the automatic execution of functions by flick operations. As shown in FIG. 7, a description will be given by using an example where the terminal apparatus 10 is displaying the capture image of the web page of "Roppongi restaurant ranking" near the center.

In such a state, if the display control unit 16e of the terminal apparatus 10 accepts a downward flick operation on the capture image of the web page of "Roppongi restaurant ranking" (S20), the display control unit 16e deletes the capture image from display targets.

Moreover, if the display control unit 16e of the terminal apparatus 10 accepts an upward flick operation on the capture image of the web page of "Roppongi restaurant ranking" (821), the display control unit 16e displays icons for selecting specific functions for the capture image. For example, the display control unit 16e makes the display unit 12 display an icon for making access to the web page corresponding to the capture image, an icon for printing the capture image, an icon for bookmarking the capture image, and so on.

In the shown example, three icons are displayed in the area left blank by the moving. However, this is not restrictive. For example, an arbitrary number of icons may be displayed in an arbitrary area. The user may arbitrarily configure the association between the icons and the functions.

Moreover, if a predetermined area of the capture image of the web page of "Roppongi restaurant ranking" is selected (S22), the display control unit 16e of the terminal apparatus 10 bookmarks the capture image. The user can bookmark interesting capture images for easy identification. While FIG. 7 describes the case of selecting the top right of the capture image, the configuration may be arbitrarily modified.

The capture image may be bookmarked as an ordinary bookmark of the web browser. In such a case, if the bookmarked capture image is selected, the browser execution unit 17 can automatically access the URL associated with the capture image and display the web page.

Flow of Processing

Figure 8:
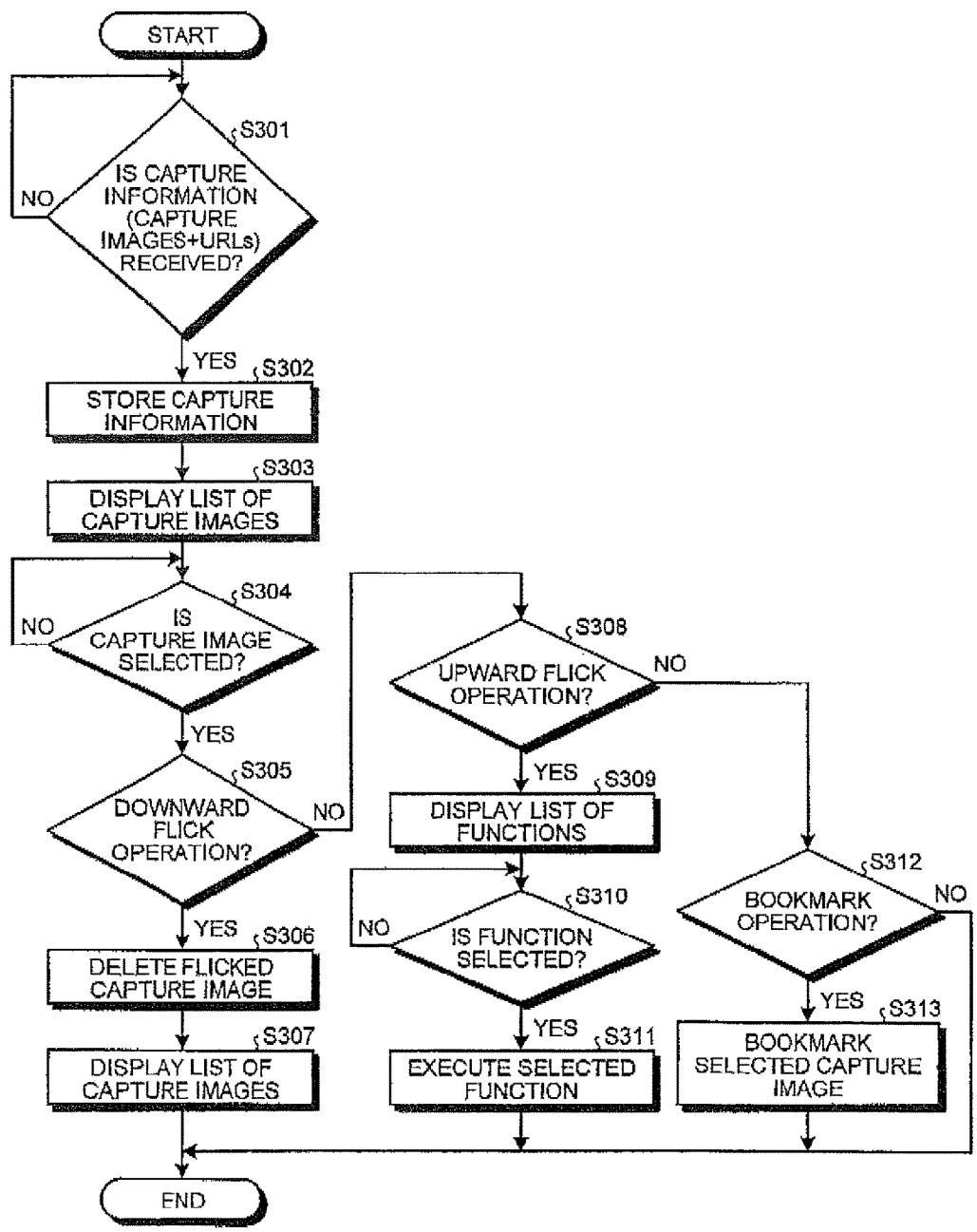
FIG. 8 is a flowchart showing a flow of processing by a flick operation.

Next, the flow of the processing described in FIG. 7 will be described. FIG. 8 is a flowchart showing the flow of processing by a flick operation. As shown in FIG. 8, if the reception unit 16d of the terminal apparatus 10 receives capture information from the capture generation server 50 (S301: Yes), the reception unit 16d stores the received capture information in the storage unit 14 or the like (S302).

Next, the display control unit 16e displays a list of received capture images on the display unit 12 (S303). If a displayed capture image is selected (S304: Yes), the display control unit 16e determines whether a downward flick operation has occurred (S305).

Here, if the display control unit 16e detects a downward flick operation (S305: Yes), the display control unit 16e deletes the information about the flicked capture image (S306), and displays a list of capture images after the deletion (S307). Here, the display control unit 16e may delete the capture information corresponding to the deleted capture image from the capture information stored in the storage unit 14 or the like. The display control unit 16e may make a distinction by setting a flag for indicating deletion.

On the other hand, if the display control unit 16e does not detect a downward flic operation (S305: No) but an upward flick operation (S308: Yes), the display control unit 16e displays the icons of a list of preset functions (S309). Subsequently, if a displayed function icon is selected (S310: Yes), the display control unit 16e executes the selected function (S311).

Moreover, if the display control unit 16e does not detect an upward flick operation (S308: No) but a bookmark operation (S312: Yes), the display control unit 16e bookmarks the operated capture image. Note that if the detected operation is not a bookmark operation (S312: No), the display control unit 16e ends the processing.

7. Dynamic Resizing of Capture Images

Figure 9:
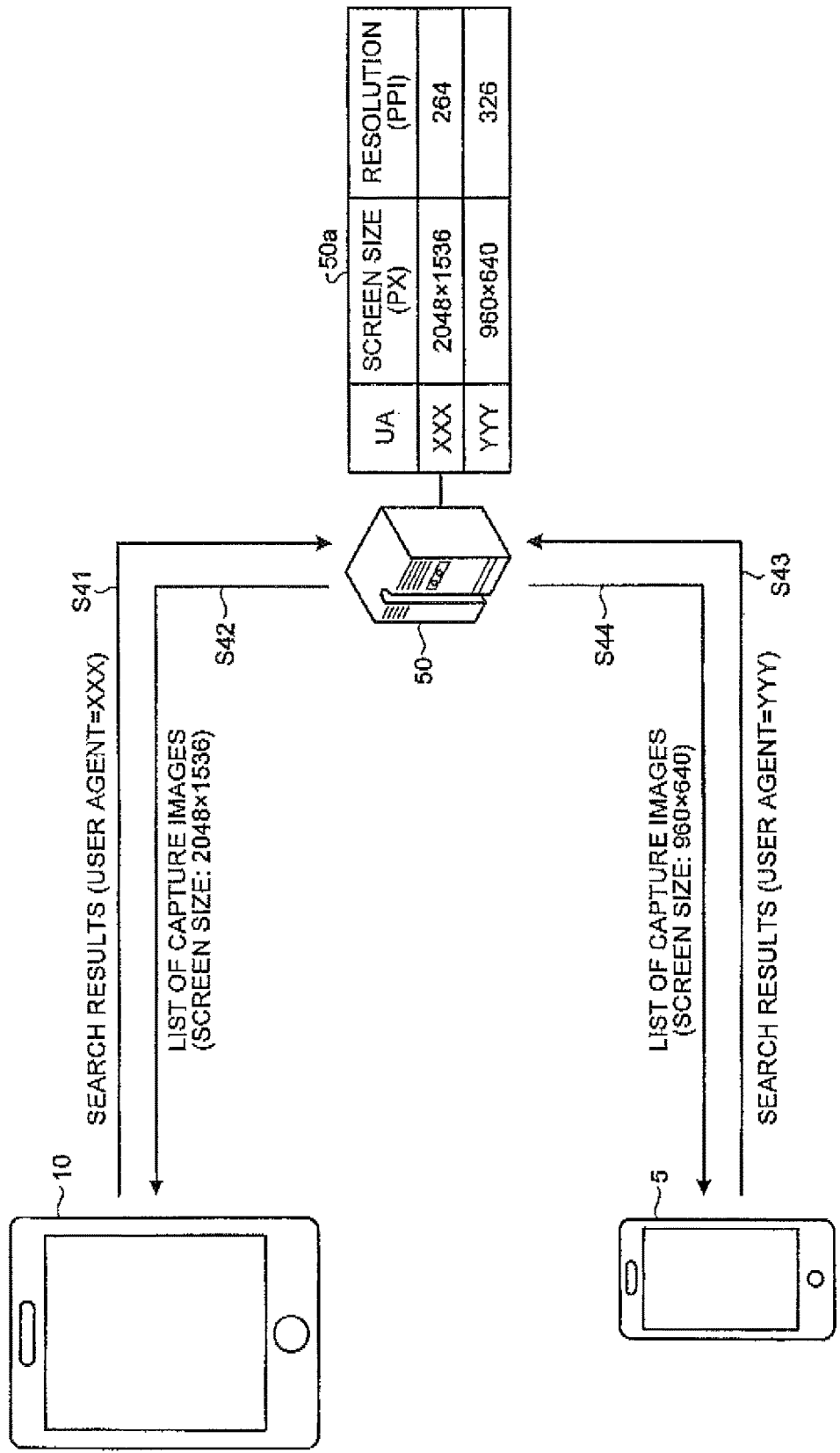
FIG. 9 is a diagram for explaining an example of dynamically resizing capture images to be transmitted according to the screen size of a terminal apparatus.

Next, an example where the capture generation server 50 dynamically resizes and transmits capture images according to the screen size of the terminal apparatus 10 will be described. FIG. 9 is a diagram for explaining the example where capture images to be transmitted are dynamically resized to the screen size of the terminal apparatus.

As shown in FIG. 9 the capture generation server 50 retains a screen change table 50a. The screen change table 50a stores "UA, screen size (PX), and resolution (PPI)" in association with each other. The "UA" stored here refers to a user agent transmitted from the terminal apparatus 10. The "screen size (PX)" is information indicating the screen size to transmit. For example, the screen size (PX) is expressed in pixels. The "resolution (PPI)" is information indicating the resolution of the screen to transmit. For example, the resolution (PPI) is expressed in PPI (Pixel Per Inch).

In the case of FIG. 9, images having a screen size of "2048×1536 PX" and a resolution of "264 PPI" are defined to be transmitted to a terminal having a user agent of "XXX." Images having a screen size of "960×640 PX" and a resolution of "326 PPI" are defined to be transmitted to a terminal having a user agent of "YYY."

In such a state, when the capture generation server 50 receives search results transmitted by the search server 30 from the terminal apparatus 10, the capture generation server 50 also receives the user agent of the terminal apparatus 10. The capture generation server 50 then dynamically changes the size and resolution of the capture images according to the received user agent, and makes a response. It should be appreciated that the terminal apparatus 10 can distribute the user agent within the system by including the user agent in a search query.

For example, as shown in FIG. 9, the capture generation server 50 receives search results including the user agent "XXX" from the terminal apparatus 10 (S41). In such a case, the capture generation server 50 identifies the screen size corresponding to the user agent "XXX" as "2048×1536 PX" and the resolution as "264 PPI." The capture generation server 50 then changes the size of the capture images to "2048×1536 PX" and the resolution to "264 PPI," and transmits the capture images to the terminal apparatus 10 (S42).

Moreover, the capture generation server 50 receives search results including the user agent "YYY" from a terminal apparatus 5 (S43). In such a case, the capture generation server 50 identifies the screen size corresponding to the user agent "YYY" as "960×640 PX" and the resolution as "326 PPI." The capture generation server 50 then changes the size of the capture images to "960×640 PX" and the resolution to "326 PPI," and transmits the capture images to the terminal apparatus 5 (S44).

In such a manner, the capture generation server 50 can dynamically resize and transmit capture images according to the screen size of the terminal apparatus. As a result, the capture images can be displayed in an appropriate screen size on the terminal apparatus side, whereby the user's comfort can be maintained.

It should be appreciated that the capture generation server 50 can also change the size and resolution of the capture images according to the communication speed with the terminal apparatus 10. For example, if the search query includes the identifier of an access point, the capture generation server 50 determines that a high-speed line is being used, and transmits high-quality capture images. On the other hand, if the search query includes the identifier of a base station, the capture generation server 50 determines that a low-speed line is being used, and transmits low-quality capture images.

Moreover, after transmitting low-quality capture images to the terminal apparatus 10 using a low-speed line, the capture generation server 50 performs packet transmission and reception with the terminal apparatus 10 a plurality of times. Then, if the line used by the terminal apparatus 10 is switched from the low-speed line to a high-speed line, the capture generation server 50 may retransmit high-quality capture images again.

8. Example of Route Change of Search Results

Figure 10:
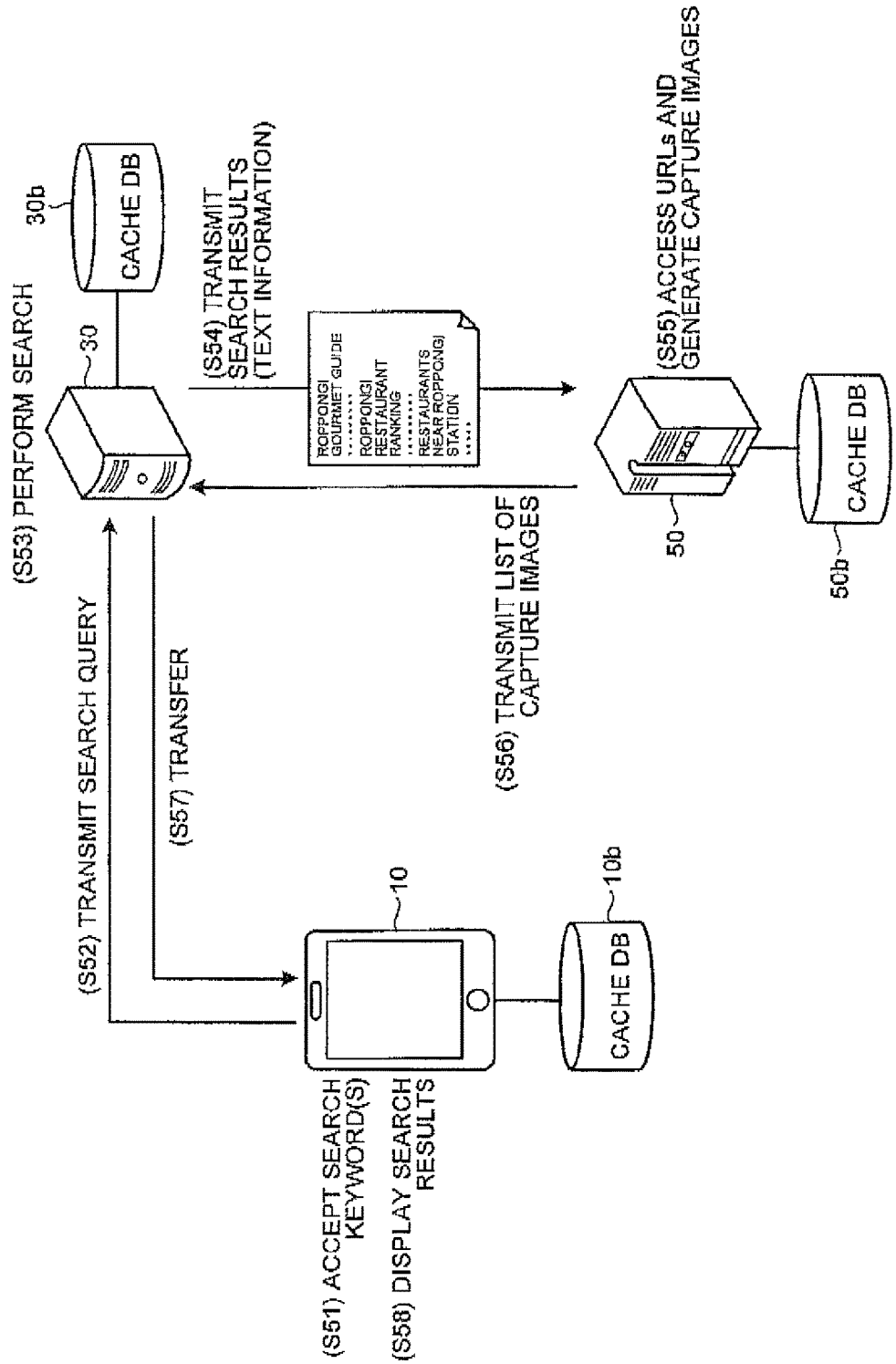
FIG. 10 is a diagram for explaining processing when a capture generation server directly receives search results from a search server.

Next, an example where the capture generation server 50 receives search results not from the terminal apparatus 10 but directly from the search server 30 will be described. FIG. 10 is a diagram for explaining processing when the capture generation server 50 directly receives search results from the search server 30. Note that the following description deals with a case where each apparatus includes a cache DB.

Specifically, the terminal apparatus 10 includes a cache DB 10b. The search server 30 includes a cache DB 30b. The capture generation server 50 includes a cache DB 50b. Each apparatus manages its cache DB according to a cache rule that defines a cache period for each search query.

FIG. 11 is a diagram showing an example of a cache rule. As shown in FIG. 11, the cache rule stores "a query type, the presence or absence of cache, and a cache period" in association with each other. The "query type" indicates the type of the search query. The "presence or absence of cache" is information indicating whether to store targets in the cache DB. The "presence or absence of cache" is set to "present" if the targets are to be cached, and set to "absent" if the targets are not to be cached. The "cache period" indicates the period for retaining the cache. It should be appreciated that the information stored here may be arbitrarily configured by the administrator.

FIG. 11 shows that if the query type is "blog," retrieved web pages or capture images are to be cached for one day. If the query type is "flash report" such as an earthquake report, capture images of retrieved web pages are not to be cached. Note that the apparatuses need not have the same cache rule. The cache rules may be arbitrarily configured for the respective apparatuses. While the rule shown here is for each "search query," this is not restrictive. For example, rules may be set by the "types of retrieved web pages."

It should be appreciated that the type of a search query can be determined, for example, from a word or words included in the search query. For example, if "blog" is included in a search query, each apparatus determines the type of the search query to be "blog."

In such a state, the acceptance unit 16a of the terminal apparatus 10 makes the display unit 12 display the input screen of a search keyword(s) and accepts input of a search keyword(s) (S51). Next, the query transmission unit 16b of the terminal apparatus 10 transmits a search query including the search keyword(s) to the search server 30 (S52). Here, the query transmission unit 16b refers to the cache DB 10b, and if the search results are not cached, transmits the search query. If the search results are cached, the query transmission unit 16b obtains capture images from the cache DB 10b.

The query execution unit 35 of the search server 30 then executes the search query transmitted by the terminal apparatus 10 to search for web pages corresponding to the search query (S53). Like the terminal apparatus 10, the query execution unit 35 obtains the web pages from the cache DB 30b if the search results are stored in the cache DB 30b.

Subsequently, the result transmission unit 36 of the search server 30 transmits search results including the titles and URLs of retrieved web pages to the capture generation server 50 (S54).

Subsequently, the capture generation unit 55 of the capture generation server 50 accesses the URLs included in the received search results to obtain web pages, and generates capture images of the respective web pages (S55). Like the terminal apparatus 10 and the like, the capture generation unit 55 obtains the capture images from the cache DB 50b if the capture images are stored in the cache DB 50b.

Subsequently, the capture response unit 56 of the capture generation server 50 transmits capture information including a list of generated capture images and the URLs of the captured web pages to the search server 30 (S56).

The result transmission unit 36 of the search server 30 then transfers the capture information to the terminal apparatus 10 (S57). The display control unit 16e of the terminal apparatus 10 makes the display unit 12 display the received capture images (S58).

In such a manner, the search system can transmit and receive search results and capture images via an arbitrary route. The terminal apparatus 10 can thus collect the capture images as the search results via an optimum route according to the state of congestions and the like of the network. While the capture generation server 50 in FIG. 10 is described to transmit the capture information to the search server 30, this is not restrictive. The capture generation server 50 may transmit the capture information to the terminal apparatus 10.

9. Example of System Using Plurality of Search Servers

Figure 12:
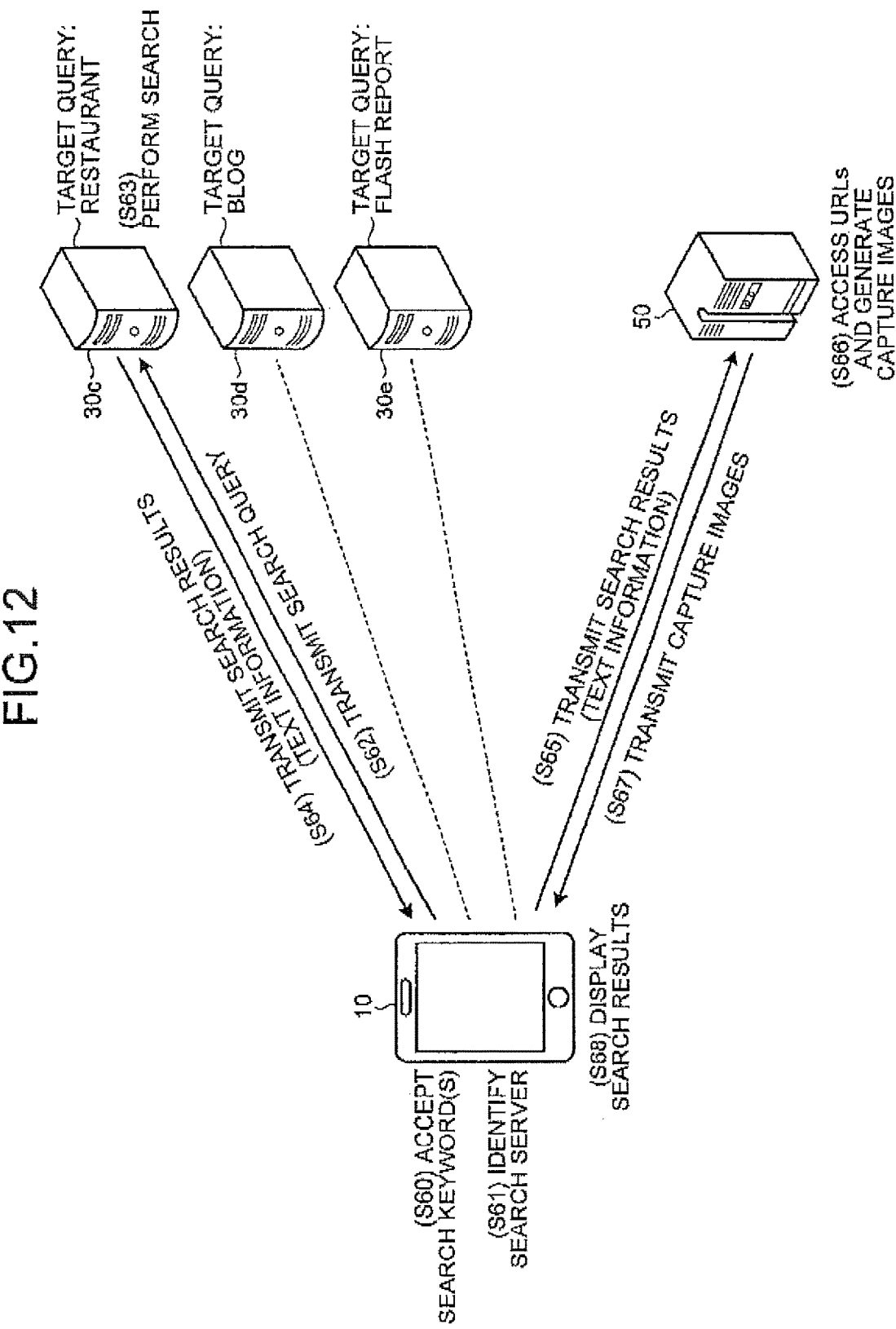
FIG. 12 is a diagram for explaining processing using a plurality of search servers.

The foregoing example has dealt with the case where one search server 30 is used to perform a search. However, this is not restrictive. A plurality of search servers may be used to perform a search. FIG. 12 is a diagram for explaining processing using a plurality of search servers. While the following description deals with three search servers, this is not restrictive. An arbitrary number of search servers may be used.

As shown in FIG. 12, the system shown here includes the terminal apparatus 10, a search server 30c, a search server 30d, a search server 30e, and the capture generation server 50. The search servers are provided for respective search queries to be processed. Specifically, the search server 30c is a search server that processes a search query corresponding to "restaurant." The search server 30d is a search server that processes a search query corresponding to "blog." The search server 30e is a search server that processes a search query corresponding to "flash report."

In such a state, the acceptance unit 16a of the terminal apparatus 10 makes the display unit 12 display the input screen of a keyword(s) and accepts input of search keywords "Roppongi, restaurant" (S60).

The query transmission unit 16b then identifies a search server to transmit the search query to, on the basis of the input search keywords (S61). For example, the query transmission unit 16b performs a character analysis and the like on the input search keywords, and extracts a word "Roppongi" and a word "restaurant." The query transmission unit 16b then identifies the search server 30c intended to search for the word "restaurant."

It should be appreciated that if a plurality of search servers are identified to correspond to the extracted word(s), one of the search servers may be identified by using an arbitrary technique. For example, higher priority may be given to a word that is input first as a search keyword. Categories to which the words belong may be weighted in advance, and higher priority may be given to a word of the highest total weight.

The subsequent processing of S62 to S68 by which the terminal apparatus 10 transmits the search query to the identified search server 30c and obtains capture images is similar to the processing of S2 to S8 described in FIG. 1. A detailed description thereof is thus omitted.

10. Effects

As described above, the terminal apparatus 10 transmits a search query to the search server 30 on the basis of an input search keyword or keywords, and receives capture images from the capture generation server 50 as a response to the search query. In other words, the foregoing search system can achieve a "browse-pages-and-meet search" instead of the conventional "read-the-text search."

As a result, the user can browse the actual web pages themselves through the search results, and can thereby recognize the atmosphere, the amount of information, and the like of the web pages. Consequently, the terminal apparatus 10 can reduce the time for the user to obtain a desired web page with improved user convenience.

Moreover, the search system provides the user with the capture images of the web pages as the search results. A response deterioration, which causes users' reluctance to use the system can thus be suppressed even if an enormous number of web pages is retrieved. As a result, an increase in the number of users of the system can be expected.

Moreover, the search results can be directly operated to execute various functions, whereby a user interface that allows simple user operations can be provided. For example, upward, downward, left, and right flick operations and the like can be used for different functions. This can make full use of the characteristics of a smartphone and the like.

Moreover, the terminal apparatus 10 can obtain and display an actual web page by simply selecting a capture image. In such a manner, similar functions to those of an ordinary web search, like bookmarking, can be achieved by simple operations. Comfortable operations can thus be provided for the user.

Furthermore, even if a capture image of a search result is scrolled, the terminal apparatus 10 can display a similarly-scrolled web page when displaying the web page corresponding to the capture image. In such a manner, the user's operation on the capture image can be interlocked with the actual web page.

More specifically, the capture generation server 50 generates and transmits the capture image of the entire web page to the terminal apparatus 10. The terminal apparatus 10 can thus display the entire web page, not a thumbnail or other partially-cut image of the web page. The terminal apparatus 10 can thus display all the information about the linked web page without displaying the web browser. As a result, the user can obtain the same information as with the web browser. In addition, since the capture image of the entire web page can be obtained at a time, it is possible to suppress communications and the like for obtaining portions of an ordinary web page that are hidden because of the screen size or the like. High-speed information acquisition can thus be achieved.

Moreover, the capture generation server 50 can resize and transmit capture images according to the screen size of the terminal apparatus 10. The search system can thus be provided independent of terminals.

Moreover, the terminal apparatus 10, the search server 30, and the capture generation server 50 are capable of caching according to a search query. This can improve response. Furthermore, for example, a long cache period can be set for web pages having a long update period, like shop information pages. A short cache period can be set for web pages having a short update time, like blogs and twitters. Web pages of which latest information is always required, like an emergency report, can be set not to be cached. In such a manner, both improved response and real-timeness can be achieved.

Moreover, the search system can include search servers for respective search queries, thereby allowing load distribution over the search servers. For example, even if the user activates the foregoing search application to search for information about restaurants and blogs at the same time, a response deterioration due to the simultaneous search can be suppressed to smoothly display the search results.

11. Other Embodiments

The embodiments of the present application have been described in detail above with reference to the drawings. Such embodiments are just illustrative, and the present embodiment may be practiced by other embodiments in which various modifications and improvements are made on the basis of the knowledge of those skilled in the art, including the aspect described in the summary of the embodiment. Moreover, the embodiments may be appropriately combined without inconsistency. Different embodiments will be described below.

Example of Screen Display

Figure 13:
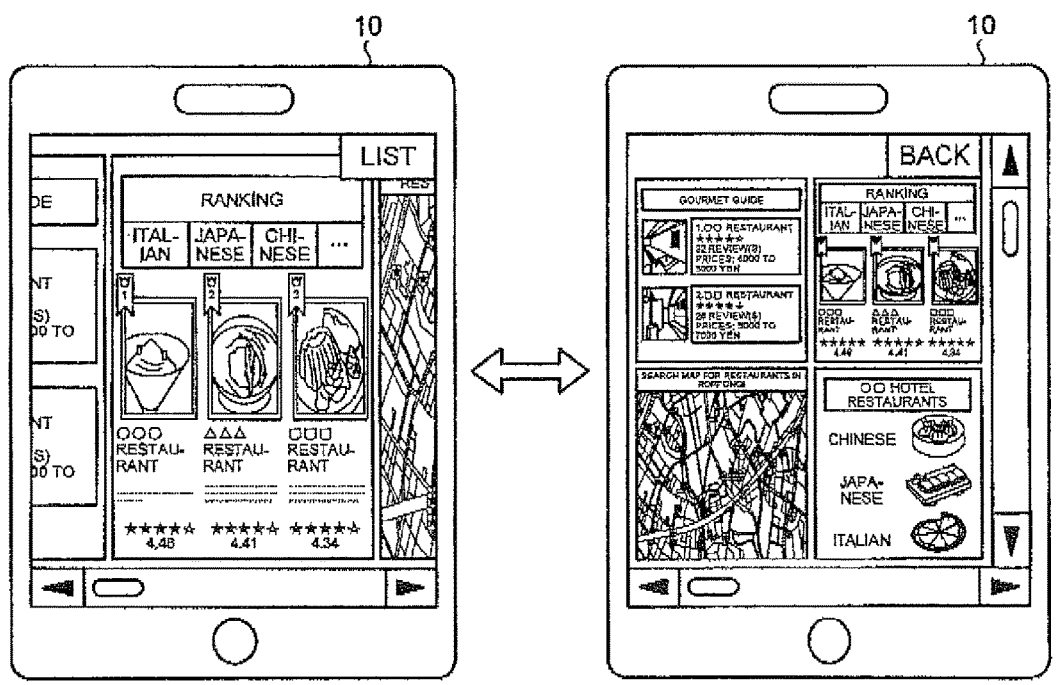
FIG. 13 is a diagram showing examples of screen display.

The foregoing embodiment has dealt with the case where the terminal apparatus 10 displays the capture images in order. However, this is not restrictive. For example, the terminal apparatus 10 may display a list of capture images. FIG. 13 is a diagram showing an example of the screen display. As shown in FIG. 13, the terminal apparatus 10 can display an icon of "list" or the like along with the capture images. If the icon "list" is selected, the terminal apparatus 10 displays a list of capture images. Similarly, when displaying a list of capture images, the terminal apparatus 10 can display an icon of "back" or the like. If the icon "back" is selected, the terminal apparatus 10 displays the capture images in order. In such a manner, the search results can be displayed in a format intended by the user.

Example of Charging

The terminal apparatus 10 according to the present application displays not web pages themselves but capture images as search results. Since the capture images are captured by actually accessing the web pages, advertisements at the time of capturing are captured therein and the user views the advertisements. Even in the case of the present application, the advertisements can thus be charged for as with a typical web search.

Figure 14:
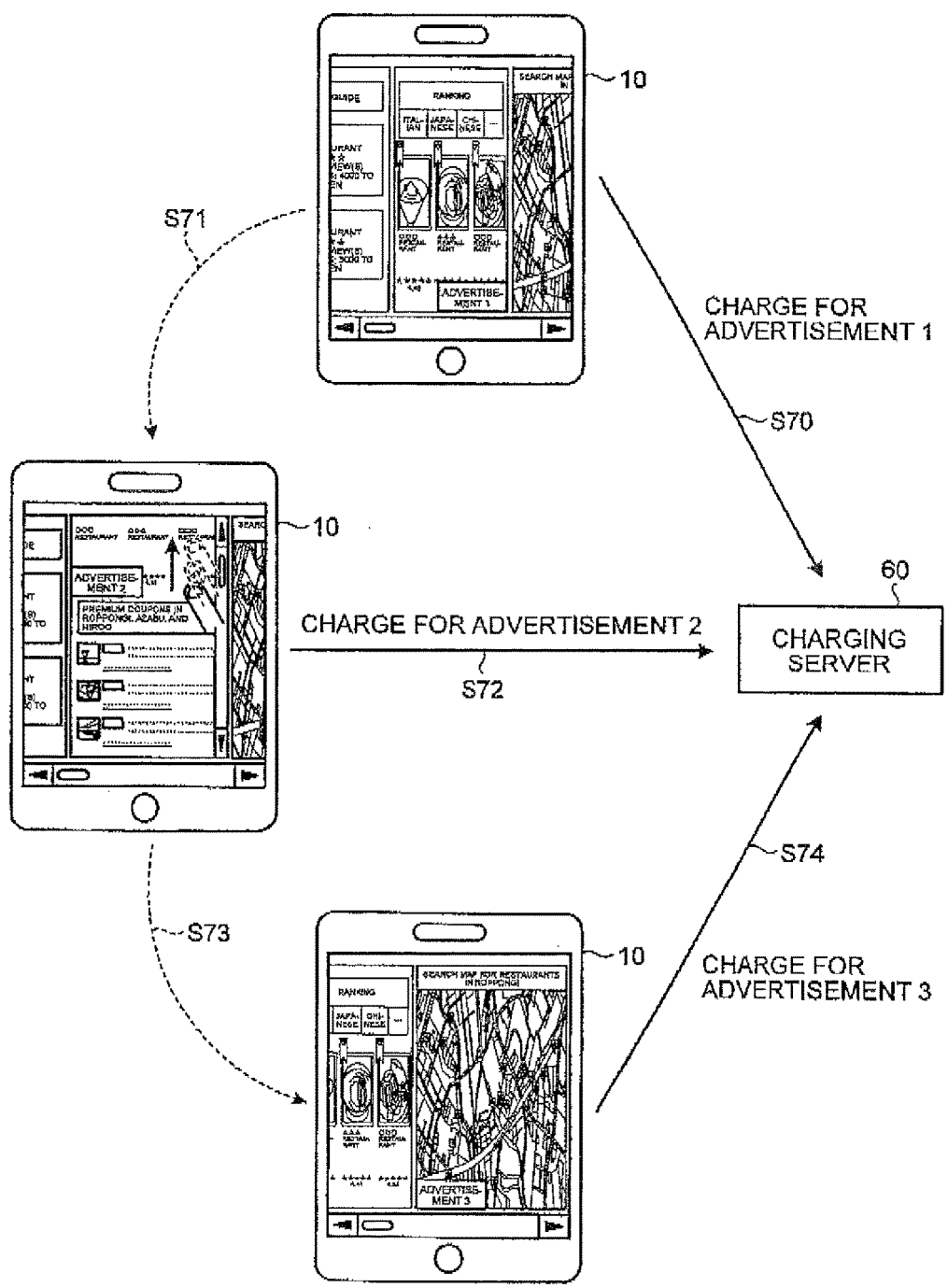
FIG. 14 is a diagram for explaining an example of charging for advertisements.

FIG. 14 is a diagram for explaining an example of charging for advertisements. As shown in FIG. 14, when the terminal apparatus 10 makes the display unit 12 display a capture image of a web page in which advertisement 1 is also captured, the terminal apparatus 10 notifies a charging server 60 that advertisement 1 is viewed (S70). As a result, the charging server 60 charges the advertiser of advertisement 1.

Moreover, when the capture image where advertisement 1 is displayed is scrolled up to display advertisement 2 (S71), the terminal apparatus 10 notifies the charging server 60 that advertisement 2 is viewed (S72). As a result, the charging server 60 charges the advertiser of advertisement 2.

Subsequently, when the capture image where advertisement 2 is displayed is scrolled to the left to display a capture image of a web page where advertisement 3 is also captured (S73), the terminal apparatus 10 notifies the charging server 60 that advertisement 3 is viewed (S74). As a result, the charging server 60 charges the advertiser of advertisement 3.

In such a manner, the search system can charge for advertisements captured with web pages each time the capture images are viewed. In such a manner, a new advertising technique and charging technique can be provided even for advertisers. This can contribute to system revitalization and user attraction.

Intermediate Server

Figure 15:
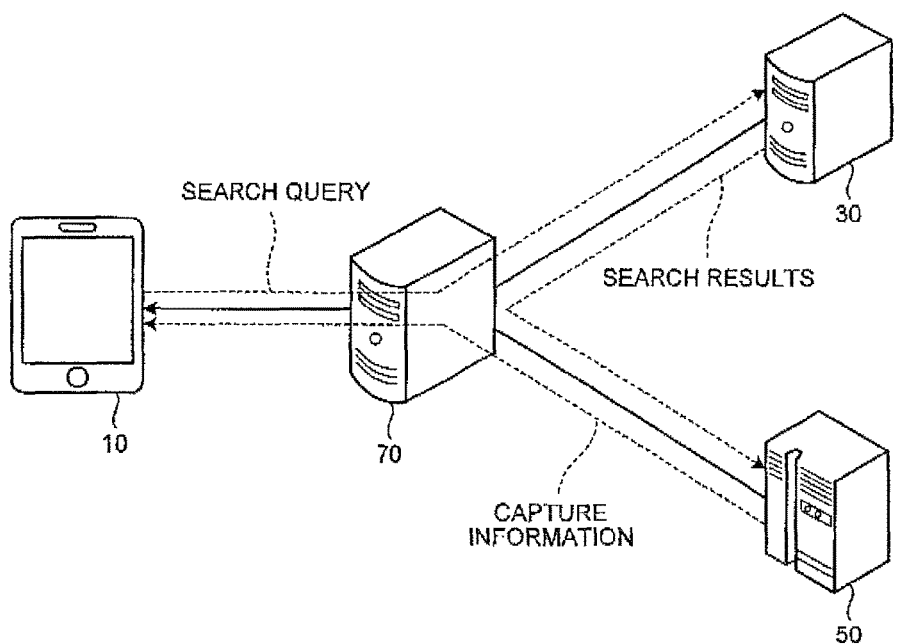
FIG. 15 is a diagram for explaining an example of an overall configuration using an intermediate server.

Aside from the configuration described in the foregoing embodiment, an intermediate server 70 may be arranged between the terminal apparatus 10, the search server 30, and the capture generation server 50. FIG. 15 is a diagram for explaining an example of an overall configuration using the intermediate server.

The intermediate server 70 shown in FIG. 15 receives a search query from the terminal apparatus 10, transmits the search query to the search server 30, and transmits search results received from the search server 30 to the capture generation server 50. The intermediate server 70 then receives capture information from the capture generation server 50 and transmits the capture information to the terminal apparatus 10.

In such a manner, the intermediate server 70 has the same function as that of the result transfer unit 16c of the terminal apparatus 10, and relays the search results on behalf of the terminal apparatus 10. As a result, the processing load of the terminal apparatus 10 can be reduced. Moreover, since the intermediate server 70 takes care of the relay function, the relay processing can be performed independent of the processing performance of the terminal apparatus 10. The performance of the search processing can be expected to be improved.

Hardware

Figure 16:
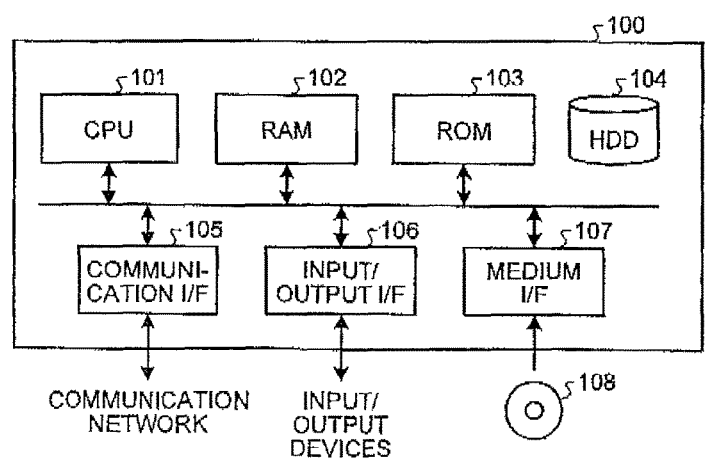
FIG. 16 is a hardware configuration diagram showing an example of a computer that implements the functions of a terminal apparatus or a server.

The terminal apparatus and the servers described above are each implemented, for example, by a computer 100 having a configuration such as shown in FIG. 16. FIG. 16 is a hardware configuration diagram showing an example of the computer that implements the functions of the terminal apparatus or a server. The computer 100 includes a CPU 101, a RAM (Random Access Memory) 102, a ROM (Read Only Memory) 103, an HDD (Hard Disk Drive) 104, a communication interface (I/F) 105, an input/output interface (I/F) 106, and a medium interface (I/F) 107.

The CPU 101 operates on the basis of a program(s) stored in the ROM 103 or the HDD 104, and controls the units. The ROM 103 stores a boot program to be executed by the CPU 101 upon startup of the computer 100, and a program(s) and the like dependent on the hardware of the computer 100.

The HDD 104 stores a program(s) to be executed by the CPU 101 and data and the like to be used by the program(s). The communication interface 105 receives data from other apparatuses via various communication lines, transmits the data to the CPU 101, and transmits data generated by the CPU 101 to other apparatuses via various communication lines.

The CPU 101 controls output devices such as a display and a printer and input devices such as a keyboard and a mouse via the input/output interface 106. The CPU 101 obtains data from the input apparatuses via the input/output interface 106. Moreover, the CPU 101 outputs generated data to the output devices via the input/output interface 106.

The medium interface 107 reads a program(s) or data stored in a recording medium 108, and provides the program(s) or data to the CPU 101 via the RAM 102. The CPU 101 loads the program(s) from the recording medium 108 onto the RAM 102 via the medium interface 107, and executes the loaded program(s). For example, the recording medium 108 is an optical recording medium such as a DVD (Digital versatile Disc) and a PD (Phase change rewritable Disk), a magneto-optical recording medium such as an MO (Magneto-Optical disk), a tape medium, a magnetic recording medium, a semiconductor memory, or the like.

For example, when the computer 100 functions as the foregoing terminal apparatus 10, the CPU 101 of the computer 100 executes the program(s) loaded on the RAM 102 to implement the functions of the search processing unit 16 and the browser execution unit 17. Moreover, the data to be stored in the storage unit 14 is stored in the HDD 104.

The CPU 101 of the computer 100 reads such programs from the recording medium 108, and executes the programs. In another example, the CPU 101 may obtain the programs from other apparatuses via various communication lines.

Moreover, the "units" described in the embodiments may be read as "means," "sections, modules, units," "circuits," or the like. For example, the search processing unit may be read as search processing means or a search processing circuit. Moreover, while the embodiments have been described, the foregoing embodiments are intended to facilitate understanding of the present embodiment and not to limit the interpretation of the present embodiment. Modifications and improvements may be made to the present embodiment without departing from the gist thereof. The present embodiment includes its equivalencies. The embodiments may be combined with each other.

According to an aspect of an embodiment, a search system, a search method, a terminal apparatus, and a search program capable of improving user's convenience can be provided.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A search system comprising:
a terminal apparatus; and
a server apparatus; wherein
the server apparatus includes a response unit configured to respond image information about a web page of a search result corresponding to the search query for a web search transmitted by the terminal apparatus to the terminal apparatus, and the terminal apparatus includes a receiving unit configured to receive the image information about the web page of the search result from the server apparatus,
a display control unit configured to display the image information received by the receiving unit on a display device and detect an amount of scrolling when the image information about the web page displayed on the display device is scrolled, and
a web display unit configured to:
obtain, when the image information about the web page displayed on the display device is selected, the web page corresponding to the selected image information about the web page and display the web page on the display device, wherein the image information about the web page is a representation of the web page rather than the web page itself, and
when the scrolled image information about the web page is selected, obtain the web page corresponding to the selected image information, scroll the obtained web page as much as the amount of scrolling detected at the time of selection, and display the scrolled web page on the display device.

2. The search system according to claim 1, wherein the display control unit of the terminal apparatus displays the image information received by the receiving unit on the display device in a scrollable manner.

3. The search system according to claim 1, wherein the display control unit of the terminal apparatus deletes the image information when a flick operation on the image information about the web page displayed on the display device to move the image information downward on a display screen is accepted, executes preset processing on the image information when a flick operation to move the image information upward on the display screen is accepted, and stores the image information when a predetermined operation on a predetermined position of the image information is accepted.

4. The search system according to claim 1, wherein
the server apparatus further includes
an acquisition unit configured to access a search server corresponding to the search query and obtain the web page of the search result corresponding to the search query, and
a generating unit configured to generate the image information about the web page obtained by the acquisition unit; and wherein
the response unit responds the image information about the web page generated by the generating unit to the terminal apparatus.

5. The search system according to claim 4, wherein
the server apparatus further includes a storing unit configured to store the web page of the search result corresponding to the search query in a cache area for a period determined according to the search query; and
wherein the acquisition unit obtains the web page from the cache area when the web page of the search result corresponding to the search query is stored in the cache area, and accesses and obtains the web page of the search result when the web page is not stored in the cache area.

6. The search system according to claim 1, wherein the response unit of the server apparatus resizes the image information about the web page according to a size of the display device included in the terminal apparatus and responds the resized web page to the terminal apparatus.

7. The search system according to claim 1, wherein the server apparatus further includes a charging unit configured to charge an advertiser when image information about a web page including an advertisement is displayed by the terminal apparatus.

8. A terminal apparatus comprising:
a query transmitting unit configured to transmit a search query to a server apparatus;
a receiving unit configured to receive image information about a web page of a search result corresponding to the search query transmitted by the query transmitting unit from the server apparatus as a response to the search query; and
a display control unit configured to make a display device display the image information about the web page received by the receiving unit and detect an amount of scrolling when the image information about the web page displayed on the display device is scrolled, and
a web display unit configured to:
obtain, when the image information about the web page displayed on the display device is selected, the web page corresponding to the selected image information about the web page and display the web page on the display device, wherein the image information about the web page is a representation of the webpage rather than the web page itself, and
when the scrolled image information about the web page is selected, obtain the web page corresponding to the selected image information, scroll the obtained web page as much as the amount of scrolling detected at the time of selection, and display the scrolled web page on the display device.

9. A non-transitory computer-readable recording medium having stored therein a search program causing a terminal apparatus to execute a process comprising:
transmitting a search query to a server apparatus; receiving image information about a web page of a search result corresponding to the search query from the server apparatus as a response to the search query;
making a display device display the image information about the web page received at the receiving;
detecting an amount of scrolling when the image information about the web page displayed on the display device is scrolled;
obtaining, when the image information about the web page displayed on the display device is selected, the web page corresponding to the selected image information about the web page and display the web page on the display device, wherein the image information about the web page is a representation of the web page rather than the web page itself, and
when the scrolled image information about the web page is selected: obtaining the web page corresponding to the selected image information;

scrolling the obtained web page as much as the amount of scrolling detected at the time of selection; and displaying the scrolled web page on the display device.

10. The search system according to claim 1, wherein the image information is a captured image of the web page after it has been rendered, the captured image reflecting the actual content and layout of the rendered webpage.

11. The search system according to claim 1, wherein:

the image information is captured images of web pages after they have been rendered, each captured images reflecting the actual content and layout of a corresponding one of the rendered webpages; and the web display unit is configured to:

obtain, when a captured image displayed on the display device is selected, the web page corresponding to the captured image and display the corresponding rendered web page on the display device, and when a scrolled one of the captured images is selected, obtain the web page corresponding to the scrolled captured image, scroll the obtained web page as much as the amount of scrolling detected at the time of selection, and display the scrolled web page on the display device.

12. The terminal apparatus according to claim 8, wherein the image information is a captured image of the web page after it has been rendered, the captured image reflecting the actual content and layout of the rendered webpage.

13. The terminal apparatus according to claim 8, wherein:

the image information is captured images of web pages after they have been rendered, each captured images reflecting the actual content and layout of a corresponding one of the rendered webpages; and the web display unit is configured to:

obtain, when a captured image displayed on the display device is selected, the web page corresponding to the captured image and display the corresponding rendered web page on the display device, and when a scrolled one of the captured images is selected, obtain the web page corresponding to the scrolled captured image, scroll the obtained web page as much as the amount of scrolling detected at the time of selection, and display the scrolled web page on the display device.

14. The computer-readable recording medium according to claim 9, wherein the image information is a captured image of the web page after it has been rendered, the captured image reflecting the actual content and layout of the rendered webpage.

15. The computer-readable recording medium according to claim 9, wherein:

the image information is captured images of web pages after they have been rendered, each captured images reflecting the actual content and layout of a corresponding one of the rendered webpages; and the process further comprises:

obtaining, when a captured image displayed on the display device is selected, the web page corresponding to the captured image and displaying the corresponding rendered web page on the display device; and when a scrolled one of the captured images is selected, obtaining the web page corresponding to the scrolled captured image.

\* \* \* \* \*